(12) United States Patent
Yerazunis et al.

(10) Patent No.: US 11,472,040 B2
(45) Date of Patent: Oct. 18, 2022

(54) TACTILE SENSOR

(71) Applicant: Mitsubishi Electric Research Laboratories, Inc., Cambridge, MA (US)

(72) Inventors: William Yerazunis, Acton, MA (US); Scott Jordan, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 551 days.

(21) Appl. No.: 16/598,106

(22) Filed: Oct. 10, 2019

(65) Prior Publication Data

US 2021/0107165 A1 Apr. 15, 2021

(51) Int. Cl.
| | |
|---|---|
| *B25J 13/00* | (2006.01) |
| *B25J 13/08* | (2006.01) |
| *G06T 7/73* | (2017.01) |
| *B25J 19/02* | (2006.01) |
| *G01L 1/04* | (2006.01) |

(52) U.S. Cl.
CPC .......... *B25J 13/084* (2013.01); *B25J 19/023* (2013.01); *G01L 1/04* (2013.01); *G06T 7/74* (2017.01); *G06T 2207/30204* (2013.01)

(58) Field of Classification Search
CPC ...... B25J 13/084; B25J 19/023; B25J 9/1697; G01L 1/04; G01L 1/241; G01L 5/166; G01L 5/226; G01L 5/228; G01L 1/24; G06T 7/74; G06T 2207/30204; G05B 2219/40575; G05B 2219/40625
See application file for complete search history.

(56) References Cited

U.S. PATENT DOCUMENTS 10,197,392 B2 * 2/2019 Clark .................. G01M 17/007

* cited by examiner

*Primary Examiner* — Ian Jen
(74) *Attorney, Agent, or Firm* — Gennadiy Vinokur; Hironori Tsukamoto

(57) ABSTRACT

A tactile sensor including a cap having a top surface and an undersurface. The undersurface includes pins, each pin has a mark. A portion of the undersurface is attachable to a device. A camera positioned in view of the marks, captures images of the marks placed in motion by elastic deformation of the top surface of the cap. A processor receives the captured images and determines a set of relative positions of the marks in the captured images, by identifying measured image coordinates of locations in images of the captured images. Determine a net force tensor acting on the top surface using a stored machine vision algorithm, by matching the set of relative positions of the marks to a stored set of previously learned relative positions of the marks placed in motion. Control the device via a controller in response to the net force tensor determined in the processor.

20 Claims, 26 Drawing Sheets

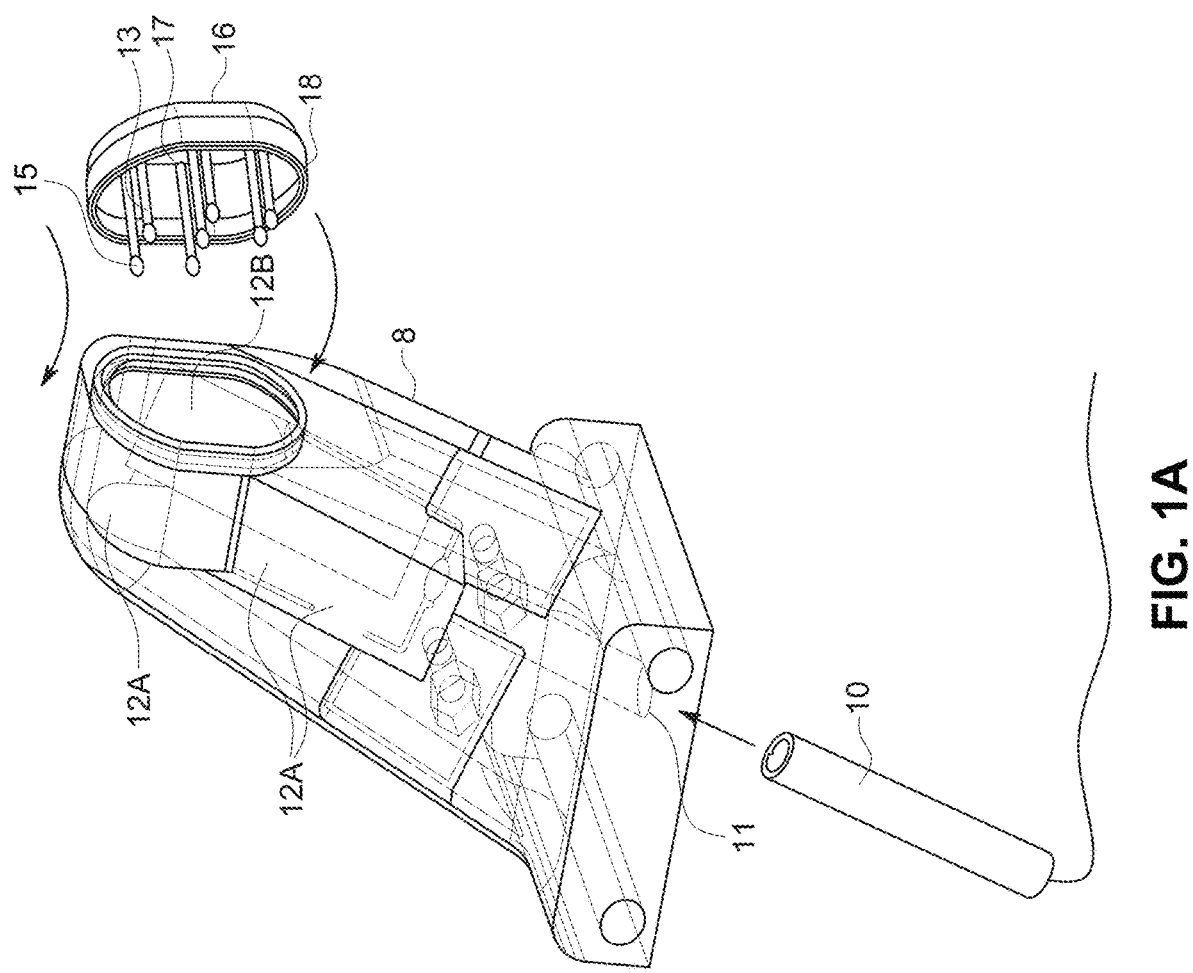

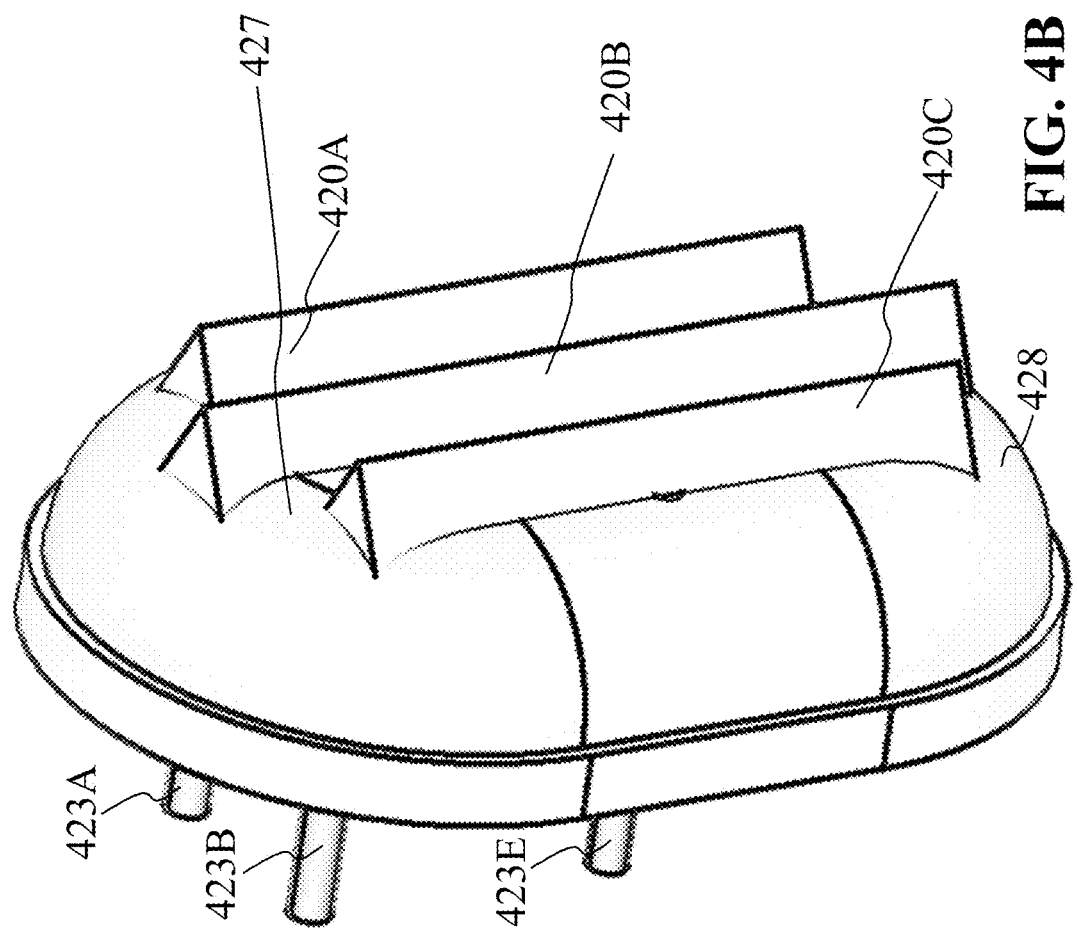

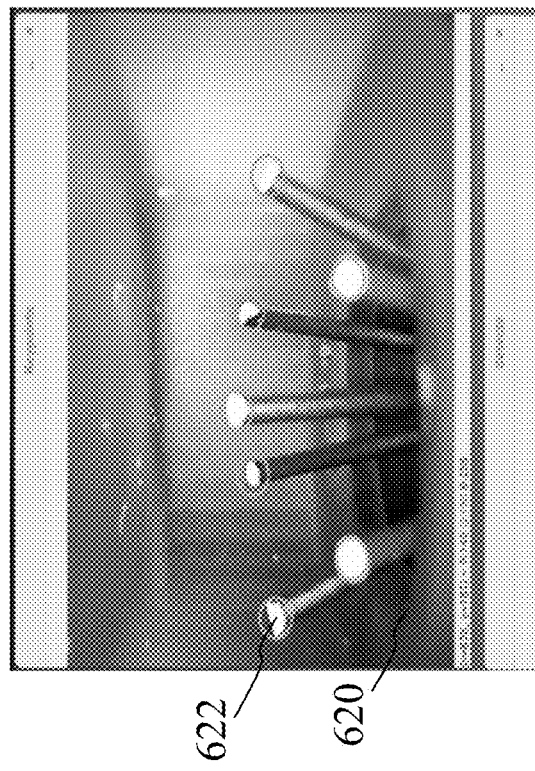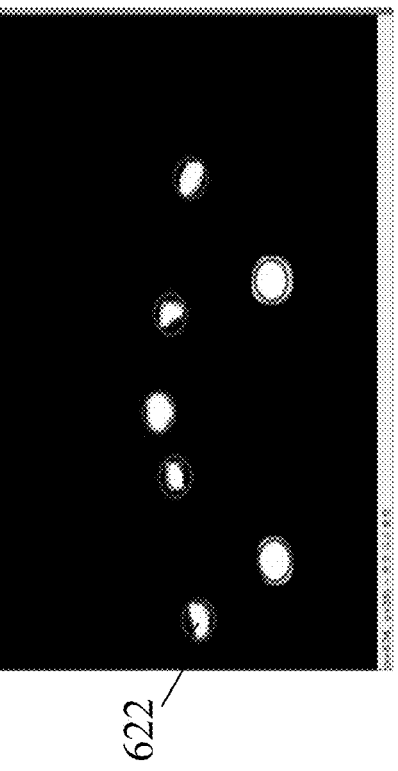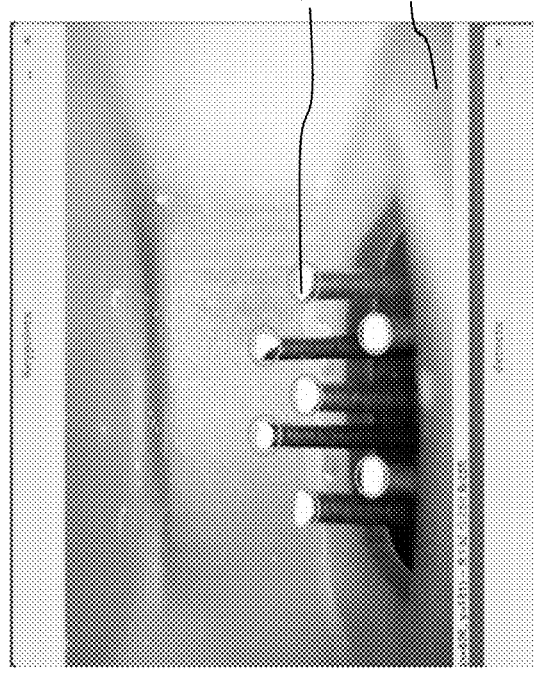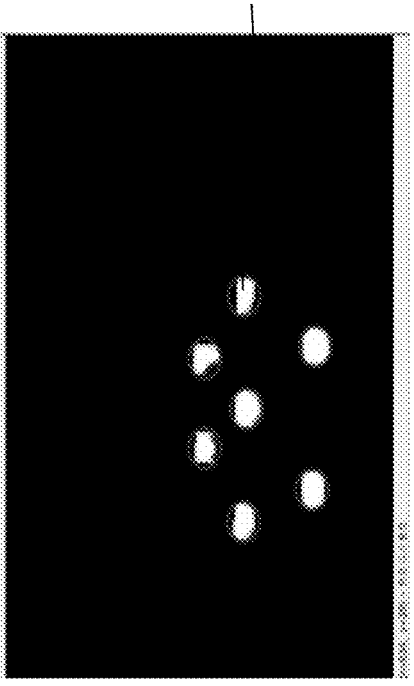
FIG. 6A (Pin view – No forces applied to outer impact surface)
FIG. 6B
FIG. 6C (Pin view – Forces applied in center of outer impact surface)
FIG. 6D

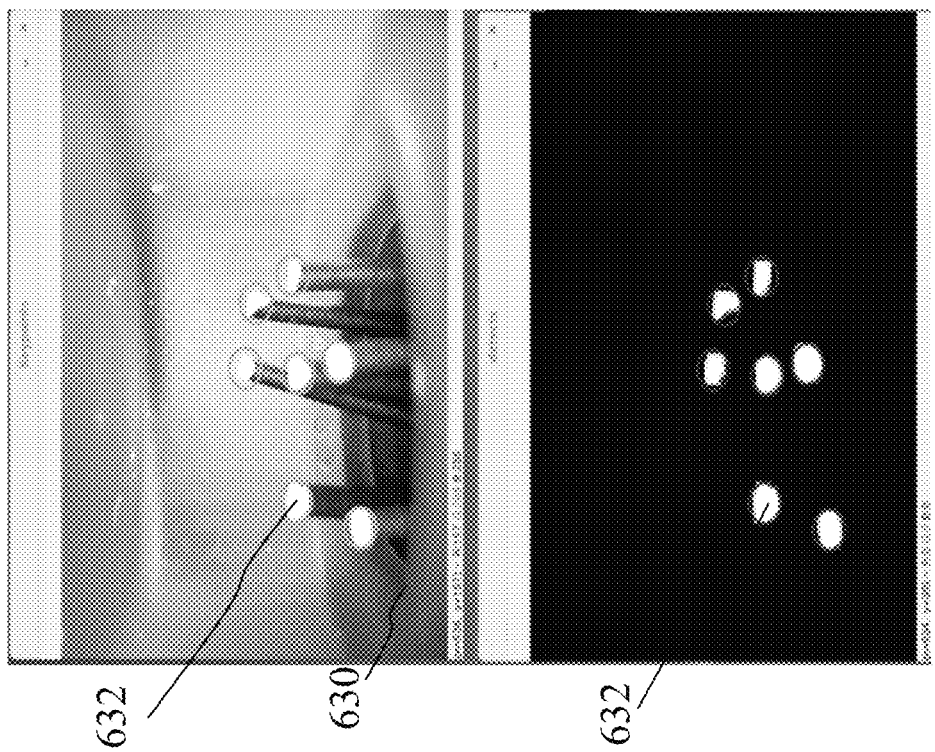

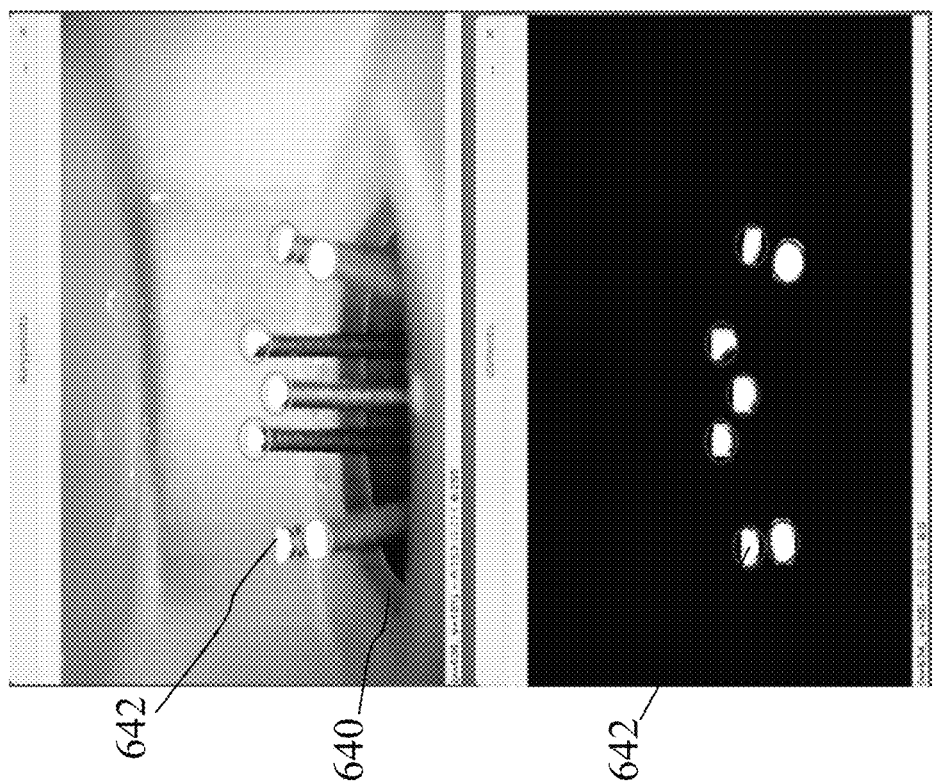

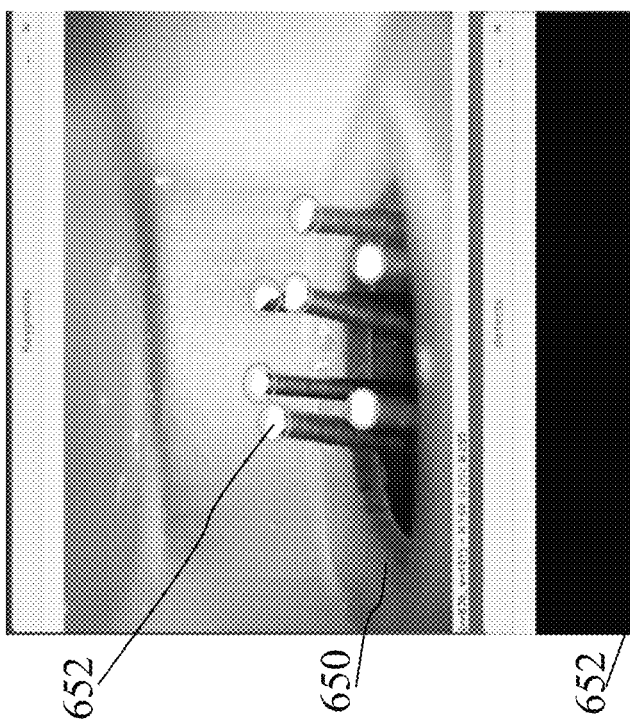
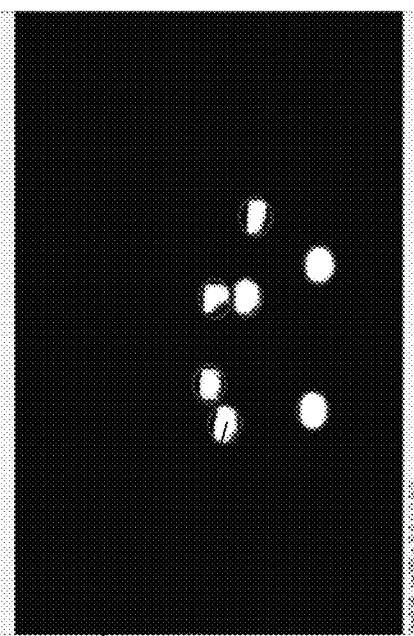
*(Pin view – Lateral shear forces applied to outer impact surface)*
FIG. 6I
FIG. 6J

*(Pin view – Off center far axial shear forces applied to outer impact surface)*

TACTILE SENSOR

FIELD

The present disclosure relates to tactile sensing, and more particularly to a tactile sensor having multiple micro mechanical pins attached to an underside of an elastomeric cap and upon exterior forces applied to a top surface, translates a pattern of forces into measurable quantities.

BACKGROUND

Robots are used for assembly, but proper assembly is dependent on the robot always gripping the part in exactly the same position and orientation. Miss-grips lead to failed assembly, damaged parts, and may damage the gripper or robot itself. Even if the part is gripped correctly, if the receiving parts are not correct (or the parts are being contaminated or distorted) the robot will attempt to force the assembly, yielding a bad assembly, damaged parts, or a damaged robot or robot gripper. For this reason, tactile sensors are used in robotic applications, for example to assist in proper assembly as well as for a variety of tasks for modem devices.

In robotics, tactile sensors provide valuable data about a state of contact between a robot hand and an object when taking hold of the object. The act of taking hold of the object by the robot hand or a gripper can include different physical effects used to guarantee a stable grasping between a gripper and the object to be grasped. For example, some effect can include: (a) an impactive effect, i.e. like jaws that physically grasp by direct impact upon the object; (b) an ingressive effect, i.e. hackles that physically penetrate the surface of the object; (c) an astrictive effect, i.e. attractive forces applied to the objects surface, such as a vacuum effect; (d) or a contiguity effect, i.e. requiring direct contact for adhesion to take place, such as glue.

Tactile sensors may identify the presence and an amount of pressure of an object, and the object's location in a gripper for robotic applications including assembly. However, most robotic sensors are based on a pressure sensor like design and measures only compressive forces without regard to shear movement or other types of forces or pressures. Shear sensors are useful, for detecting a movement of a grasped object, among other aspects.

SUMMARY

The present disclosure relates to tactile sensing, and more particularly to a tactile sensor having multiple micro mechanical pins attached to an underside of an elastomeric cap, and upon exterior forces applied to an outer impact surface of the cap, the micro mechanical pins translate a pattern of forces into measurable quantities.

Some embodiments of the elastomeric cap include mechanical deflection amplifying pins, i.e. micro mechanical pins (hereafter "pins") that flex under pressure, shear, and torque. Each tip of the pin carries at least one mark or fiducial marker, such as a white or a colored paint or retroreflective paint, wherein against a dark background these marks can be easy to track with machine vision algorithms. The motion of deflection of the elastomeric cap, under pressure, offset pressure, shear, or torque, can be recorded, yielding a level of sensitivity that is higher when compared to a level of sensitivity of a conventional tactile sensor. In fact, the pin can be modified to include one or more lever arm extending away from the pin, i.e. similar to a tree like figure or shape; wherein at a tip of each lever arm may include at least one trackable mark. Based upon experimentation, the addition of the one or more lever arm on the pin resulted in a level of magnification of sensitivity that is higher, than a level of magnification of sensitivity of a pin without one or more lever arm. Thus, the one or more lever arm amplified each pin level of magnification of sensitivity, yielding a higher sensitivity of the elastomeric cap.

Unlike conventional tactile sensors that can record or measures only compressive forces without regard to shear movement or other types of forces or pressures, the present disclosure is sensitive to compressive forces, to shear, torque, pinch, and spreading forces on the elastomeric cap. The embodiments of the present disclosure are configured to record and measure a pattern of forces acting upon and which causes motion of deflection of the outer impact surface. For example, the pattern of forces recorded or measured include the motion of deflection of the outer impact surface under pressure, offset pressures, shear forces, or torque forces, using one or more video camera or webcam(s). The one or more video camera views the marks or fiducial marks, by non-limiting example, at an oblique (zero to ~20) degree angle, or at some other angle. At least one embodiment of the present disclosure includes using machine vision algorithms that match the marks motion to a pre-stored or pre-learned set of marks deflections, with interpolation, if necessary, to determine the pattern of forces or net force tensor on the outer impact surface of the elastomeric cap.

In more detail, and in a simple preferred embodiment, can be a tactile sensor, i.e. an elastomeric tactile sensor embedded in a finger of a robot gripper; preferably this robot gripper includes a controllable force capability, rather than a single-bit "close with full force" along with "open with full force" control. For example, as the gripper closes, causing a pattern of forces to the outer impact surface, a video camera records images of the underside of the elastomeric cap, or cap, including the marks positioned on the marks, or micromechanical pins. Because the micromechanical pins are very low mass, very long compared to their diameter, and free to move, they provide a 3-30× expansion of a strain-induced motion of the elastomeric cap, which also make even small angular distortions highly visible and therefore highly measurable. As will be described in further detail, the elastomeric cap, in particular, the pins and lever arms with marks, can be customized according to different types of intended measurable sensitives, which can depend upon the types of patterns of forces applied to the outer impact surface of the cap.

For example, aspects of customization to obtain different measurable sensitivities can include customization of different structural configurations of the elastomeric cap, including combinations of patterns and structural configurations of the outer impact surface (attributes) or pin configurations on the undersurface. At least one sample of customization can include a combination of attributes, i.e. ridges, cones, smoothness, rough textures, customized part-specific shapes that conformably fit particular items to be assembled in a particular robotic task, specifically patterned on the outer impact surface, in combination with the pins structural design, i.e. each pin location on the undersurface, pin diameter, an amount of elasticity of each pin(s), pin length, amount of levers per pin, pattern(s) of pin structural design, on the underside of the cap. Reasons for the customization can be for determining a higher level of measurable sensitives of a specific pattern of forces or a single force, according to a user specified application. For example, if the gripper was configured to undertake a series of tasks or movements directed to shear forces, the user can structurally configure, together, the combination of attributes and structural designs of the pins, that would result in recording a higher level of measurable sensitivities specific to shear forces as well as the patterns of forces, if need be.

At least one realization gained from experimentation that discovered aspects of the customized measurable sensitivities to specific patterns of forces or a single force included a micromechanical lever attached or positioned at a juncture zone between a flat section of the underside of cap and a radius section. Discovered was that when the cap is pressed down 0.1 mm the radius section will be forced to change curvature and curve more tightly. More precisely, the radius section distorted from a 10 mm radius to a 9.9 mm radius. Assuming the cap material acts relatively incompressible and bends rather than bulges, that translates to a change in arc length of the cap from exactly 90 degrees and 15.7079 mm long undistorted, to a constant length of 15.7079 mm over a 9.9 mm radius, so 15.7079=9.9 mm*new angle, and new angle is 1.5866 radians or 90.905 degrees, which is a distortion of 0.905 degrees in the radius. Because the flat top of the outer impact surface of the cap is supported by the pressing object, the flat top of the outer impact surface will remain mostly flat and most of the accommodation will be in the side wall. Thus, the micromechanical pin will move up 0.1 mm (with the cap) but also bend outward about 0.9 degrees.

Assuming our micromechanical pin is 20 mm long, consistent what we experiment with, sin (0.9 deg)*20 mm=0.31 mm lateral displacement due to tilt in the micromechanical pin. The pin also moves vertically, for a total motion of just under 0.4 mm. This shows a gain of about 4×, which is remarkable and increases the measurable sensitivities via the marks on the pins specific to the pattern of forces applied to the outer impact surface of the cap.

Of course, this is an oversimplification due to the two-dimensional nature of the example. Two effects need to be addressed: first, the rim of the elastomer cap at the base of the radius is fixed in both position and angle with respect to the camera, and second, the base rim of the cap has much larger stress-bearing cross section compared to the juncture of the cap top flat, to a first approximation, there is about twice the cross section at the fixed root of the elastomer cap as at the flat top, doubling the strain (and distortion, and tilt) experienced by the microlever. Secondarily, the rim of the cap being fixed pushes the distortion into the central area of the cap, again doubling the strain, (and distortion, and tilt) experienced at the base of the microlever.

In sum, for a 0.1 mm distortion on the outer impact surface of the elastomeric cap, there is a tip motion of the microlever tip that experiences about 1.6 mm movement, which is predicted from manual calculation and finite element modeling, and later confirmed by actual experiments using 3-D printed elastomer caps with microlevers and fiducial marks. Most of this amplification of motion is due to the tip and tilt experienced at the base of the microlever, and lack of any impediment to the desired aspects of tip, tilt, and rotation in response to external surface forces, such as a reinforcing or supporting gel is at least one important aspect of the present disclosure.

The observed 1.6 mm of fiducial mark motion is larger than the diameter of the pin itself and is far larger motion than a direct observation of the surface moving at 0.1 mm. This is the justification and purpose of the freely moving microlevers in the present disclosure; this is a very large gain of 16x in an observed displacement due to strain distortion in the elastomer cap. This observed displacement is remarkable and can be measured using a simple video camera, such as web camera.

Because of this microlever distortion gain, the images captured by the video camera have large motions in the fiducial marks and have much better signal to noise ratio compared to the conventional tactile sensor methods, which directly imaged the top surface of the contacting surface, either by grazing illumination or through a proxy of a hemispherical gel.

The use of independently moving microlevers also allows different parts of the cap to experience and report back drastically different local strains and forces. For example, part of the cap may be in left-to-right shear, an other side of the cap may be in right-to-left shear, and because the microlevers move freely rather than being captive in a continuous gel, the custom configuration of the sensor can correctly detect this situation as a surface torque rather than being insensitive to that particular set of forces, like that as a hemispherical gel would be insensitive to these particular set of forces.

Several experiments were undertaken in order to take advantage of these microlever-amplified fiducial mark motions to generate a force signal output. Some aspects considered included structurally arranging a fixed camera at different positions within a cavity of the gripper. For example, the fixed camera captures images of the fiducial marks attached to the pins. The images are sent to a computer, wherein an inexpensive webcam camera is connected via USB to the computer running Debian Linux software, as according to at least one experiment, but clearly, other experiments included different types of cameras, camera positions, camera mounting arrangements, as well as other types of software.

On the computer, image processing software can be used to extract the XY positions of each fiducial marker. Obviously, many different but similar image processing software methods exist, but the preferred method included using an open-source package "OpenCV". At least one realization gained is that not every mark needed to be in view of the camera or cameras, all of which would depend upon the specific application.

Because the number of such XY pairs is equal to the number of fiducial marks, and is small (at least for some of these specific experiments, just seven pins carrying fiducial marks were used), the next step was to do a pair-by-pair matching of the set of observed fiducial mark XY locations against a pre-stored library of fiducial mark XY locations. The pre-stored library of fiducial mark XY location was earlier produced by providing a known and controlled force onto the elastomeric cap, and recording the XY locations of the fiducial marks as found by the image processing chain. For example, we might apply compressive forces of 0, 1, 2, 5, 10, 15, and 20 newton's at each of six locations (which we define as "zones") on the cap, cap-general shear forces of 1, 2, 5, and 10 newton's in each of the four principal in-plane directions, torques of −10, −5, −2, −1, 1, 2, 5, and 10 newton-meters, pinches in the axial direction at 2, 5, and 10 newton's and lateral pinches and spreads at 2, 5, and 10 newton's in three different axial positions (zone1 to zone2, zone3 to zone 4, and zone 5 to zone 6), for a total of 7+4*4+8+2*(3+3*3)=55 different sets of XY locations, each set containing multiple individual XY locations, one location for each fiducial mark. For an experiment using an elastomeric cap with seven pins, each pin bearing one fiducial mark, these results in seven XY locations to be associated with each of the 55 known and controlled force settings.

Each set of XY locations associated with a particular known and controlled force setting is labeled; this label may be human-understandable text strings such as NO_CONTACT, 10_NT_COMPRESSION, 2_NT_SHEAR_EAST, 2_NT_CENTRAL_PINCH, and so on. Each set of XY locations may also be associated with a vector of forces, say, for example forces in Z1 (compressive in zone 1), Z2 (compression in zone 2), up through Z6 (compression in zone 6) X shear (negative numbers indicating an opposite direction of shear), Y (shear), A (overall torque on the X axis, and P (pinch) 0 (axial pinch) and P1 through P3 (zone 1/zone 2 pinch/spread, zone3/zone4 pinch/spread, and zone5/zone6 pinch/spread).

For this particular set of experiments fewer than 50 pre-stored XY sets where stored in a memory in the pre-stored library database, that resulted in giving excellent resolution and usability. Of course, that more than 50 pre-stored XY sets can be stored in the pre-stored library database, however, for these sets of experiments, 50 pre-stored XY sets appeared to be sufficient to reach some of the goals according to some aspects of the present disclosure.

A next step included using a Pythagorean metric (square root of the sum of the squares of the X and Y differences); to determine a best match of an observed fiducial XY location against the pre-stored XY sets in the library. At least one surprising result was that this computation was very fast; each of the observed XY locations was compared to every pre-stored XY location in the pre-stored library; a "running tally" for each of the 50 or so pre-stored sets was maintained on an assumed basis that every fiducial mark is represented in each of the pre-stored sets once only, so each pre-stored set running tally was incremented by the Pythagorean distance between the observed XY fiducial location and the nearest pre-stored XY location of any fiducial within any given pre-stored set. In some application, during experimentation we found it unnecessary to track which observed XY fiducial location corresponded to which XY pin; merely "the closest XY, in some applications we didn't care about duplicates or re-use" which resulted in giving excellent results with extreme simplicity of coding.

In more rigorous terms, the Pythagorean metric in a preferred embodiment works can be stated as follows for a cap with k fiducial pins:

For any observed XY set OBS containing k XY pairs
OBS_X[0 . . . k−1], OBS_Y[0 . . . k−1]
and any stored XY location set STO containing STO_X[0 . . . j−1],STO_Y[0 . . . j−1] and using the function PDIST(arg1, arg2, arg3, arg4) defined as the square root of the sum of the square of arg1 minus arg2 plus the square of arg3 minus arg4 (that is, SQRT ((arg1−arg2)^2+(arg3−arg4)^2); this is the Pythagorean distance formula.

Then preferred distance value between any observed (OBS) XY set and any stored (STO) set is:
Preferred Distance=SUM_over_all_k (MIN_over_all_j (PDIST (OBS_X[k], STO_X[k], OBS_Y[k], STO_Y[k])))

As noted above, the surprising result from this experimentation was that this computation was exceptionally fast; with 10 fiducial marks and 100 pre-stored library sets, there are 1000 XY pair-to-pair comparisons, which is 2000 squares, 1000 adds, and 1000 square roots or ~4000 floating point operations in total. Which meant, and realized is that this is highly tractable method, with fantastic results, in view of the process configuration for even a most inexpensive microprocessor to perform, at well above a camera frame rate. Of course, more than 10 marks can be tested, this particular amount was used for experimentation.

The next step included employing the sum of the Pythagorean distance running tallies to sort the list of pre-stored XY location sets into a ranked quality of a match list, in order from lowest Pythagorean distance (best match) to lowest (worst match).

In some applications, a single best match can be the only one desired and output by the sensor processing. For example, "GRIP OK" versus "NO OBJECT FOUND" versus "GRIP TOO TIGHT" versus "GRIP ON EDGE" might be labels for some of the stored XY location sets, and so those would be output by the sensor processor. It should be noted that there is no prohibition on having multiple stored XY location sets that have the same label; there might be five or ten "GRIP ON EDGE" possibilities, and based on the application, it might not be necessary or even useful for the downstream systems to know exactly which one was the best match—all that matters were that it was an edge grip.

In other applications, may depend on choosing to output a sensor result that is some particular weighting, inverse weighting, or linear combination of the forces that were in effect when a particular stored XY location set was recorded.

It is also reasonable to limit the number of stored XY sets to be evaluated in the weighting, inverse weighting, or linear interpolation; typically, the best-matching (lowest Pythagorean distance) two or three stored XY location sets give the best accuracy for 1-dimensional problems, and four to six for two-dimensional, six to eight for three dimensional, and so on. The methods of the present disclosure as realized from experimentation are highly customizable to a user's specific application needs/requirements, i.e. types of measurable sensitivities regarding different types of patterns of forces or a single force, all the while using very inexpensive components including using an inexpensive microprocessor to perform, at well above a camera frame rate.

As noted above, the pins translate something hard to measure, such as a pattern of forces or net force tensor, into something easy to measure. That is, measuring is made easier based upon image motion of the free micro mechanical pin tips or ends, i.e. the image motion of the mark at the outer most end of the pin, is tracked by a camera, such as an inexpensive webcam, that views the pin tip at some angle. The pins tips can be continuously viewed by the camera prior to the motion of the pin tip, i.e. before forces are applied on the outer impact surface of the elastomeric cap, during motion of the pin tip, i.e. while the forces are being applied to the outer impact of the elastomeric cap, and after the motion of the pin tip has stopped, i.e. after the externally applied forces have stopped.

Some other aspects learned while experimenting with different combinations of attributes of the outer impact surface with combinations of pins configurations, resulted in useful realizations such as:

A) intentionally allowing the pins of the present disclosure to become substantially nonparallel even under symmetrical forces, was later discovered as at least one key aspect in detecting asymmetrical forces, shears, and torques on the pin tip;

B) Constructing some configurations of the elastomer cap of the present disclosure with fewer pins, by non-limiting example, a number of pins in a range of 5 to 10 pins for a thumb-sized sensor, resulted in substantial measurable force tensor. A larger number of pins, such as over 100 pins or 200 pins, did not provide a level of measurable sensitivity that met some of the goals of the present disclosure, thus a much fewer number of pins were targeted for some embodiments of the present disclosure.

C) Asymmetric pins: Some embodiments of the present disclosure intentionally placed or arranged fewer pins asymmetrically on the underside of the cap. Such that, some pins were placed on lower angles of the asymmetric cap or on an edge of the cap, between a rounded fillet and a flat face of the cap. Some experimental results showed a larger amount of sensitivity of the cap as compared to pins located in a middle of the cap, i.e. not on the edges. In addition, the pin lengths can be staggered, and for highly optimized sensors, for example, when using a Finite Element Modeling (FEM), the FEM can indicate some pins have an asymmetric (highly elliptical or even a flying-buttress-like) base. Such that, this assists in nonparallel motion even for symmetric forces; and D) Oblique camera angles: instead of viewing along the Z axis (which requires 75-100 mm vertical height), viewing obliquely (usually at 10 degrees or so, along with staggered pin lengths, allow a zero-degree viewing angle, parallel with a plane of a gripper tip). As a result, it was learned that this presented an opportunity to use a sensor that is only about 10 mm to 20 mm thick, without loss of sensitivity to force, shear, and torque, as well as permits for the use of the elastomeric cap sensor of the present disclosure for both tight-spaces and tight space assembly. Other benefits/advantages are that the sensor can be used in a human-worn "teach glove" that records a proper force tensor to be applied during a robotic assembly operation, by non-limiting example. Noted, is that other camera angles could be utilized including 0-10 degrees, 10-15 degrees, 10-20 degrees and 15-30 degrees.

In sum, some of the realized structural configurations of the cap, by non-limiting example, discovered can include: (1) dimensional thickness, such as, uniform thickness or non-uniform thickness of the outer impact surface; (2) dimensional shape, such as uniform cap shape, such as an oval cap shape, half-circle cap shape, hemispherical cap shape, etc., a non-uniform shape; (3) dimensional height, width, length and depth of the cap; (4) type of material(s) of the cap, along with locations of the different types of materials making up the cap; and (5) how the cap is constructed/manufactured including three dimensional (3D) printing, a type of molding manufacturing process, etc. Also, the number of pins to be mounted/attached/molded to the underside of the elastomeric cap, can depend on many factors (as learned from experimentation), for example, is that what was realized is that the number of pins can be dependent on a specific application based upon a user intention and goal(s), in terms of achieving a predetermined level of sensitively, durability, etc.

Another imaging processing method experimented with and will be used with some of the embodiments of the present disclosure can be a Finite Element Modeling (FEM) method. For example, in order to process the data generated from the captured images of the camera that include the pins movement, can be using the FEM method to process the data as a metamaterial design. A metamaterial is an object where the internal structure produces a final object whose physical properties (electrical, magnetic, mechanical, thermal) properties are markedly different than the bulk properties of it's constituent "real" materials, i.e. negative $\varepsilon$, $\mu$, nearly arbitrary speed of light c, Poisson's ratio v or thermal conductivity $\kappa$. Because the cap has an elastomer outer surface which behaves as a moderately stiff rubber (Poisson's ratio close to 1.0, and a modulus of elasticity on the order of 0.01 GPai, typical for rubber), while the inside microlevers move freely in the viewing area, emulating a material with a Poisson's ratio of nearly 0.0 and a modulus of elasticity close to 0 as well), analysis of the cap as a unit must either emulate the cap as a multicomponent metamaterial, or must contain the fine details of the cap, cap rim attachments, cap texture and surface feature elements, and the microlevers. This second method is preferred.

Using this second method, the FEM model can predict elastomer deformation under different loadings. In addition, the elastomer pins elevate the surface profile and convert surface inclination into an easy-to-image XY motion, i.e. using low cost webcam images of the pin tips. Further, the structural design of the cap with fewer fiducial marks provides for simple image thresholding, no interframe tracking/ambiguity. In fact, it is possible to use OpenCV to track the pin tip's motion that is converted to a force map. This minimizes computational expense and maintains a high frame rate.

During experimentation, an inverse FEM proved to be computationally expensive. What was realized is that training of the model should be with real data. An aspect further learned from experimentation is that using Euclidean distance in a 14-dimensional space to a label situation with grasp position, angular pose, shear and torque, proved beneficial. For example, the computational time was very fast, i.e. an amount of computational cost proved very low, resulting in an ability of processing in real-time with an excellent visualization on one 1 GHz cpu (e.g. Raspberry Pi Zero).

In some cases, computing an actual force tensor or pattern of forces may be unnecessary, such that a simple comparison of the pin tip positions against a preset library of correct and incorrect images is sufficient to determine a proper or improper robotic grasp, or interpolated against a library of known distortions to yield good estimates of the actual force tensor on the sensor in real time.

Other embodiments of the present disclosure also address todays industrial needs by providing benefits such as simple compact tactile sensors at a low-cost, low-mass, along with a shallow-profile, while delivering highly sensitive sensing of applied external forces on the elastomeric tactile sensor. Some of these benefits allow for the compact tactile sensor of the present disclosure to be used in technologies where prior conventional tactile sensors use proved too costly for different technological industries. For example, simply placing delicate foodstuffs like fruit, sushi, or baked goods requires a level of touch control that makes a human employee which such human labor is expensive, however, a robot equipped with the elastomeric sensor will result is a much less expensive venue.

As noted above, most conventional robot grippers have many problems, including little or no tactile sense that creates a problem for conventional robots to be used for flexible assembly lines. At least one reason, among many, is that these conventional specialized gripper fingers used for high precision part grasping and grasp validation cannot be used for flexible assembly lines, because they are not operationally capable of incorporating an amount of flexibility that allows the gripper to react in case of changes, whether predicted or unpredicted. Similarly, the conventional robots have a low level of capability to know if an actual assembly operation was successful or not. In order to overcome these problems of conventional robots, some embodiments of the present disclosure are configured as a mechanically robust general-purpose gripper fingertip that provide recordable measurable sensitivities of a pattern of forces, a single force, a full force set in terms of pressure, translation, rotation, shear, pinch and stretch, that can be used, by non-limiting example, for flexible assembly lines.

According to an embodiment of the present disclosure, tactile sensor for a robot, including an elastically deformable element including an outer impact surface and an undersurface having pins, ridges, or both. Each undersurface pin or ridge includes a mark, and the elastically deformable element is attached to a gripper of the robot. A camera positioned in a cavity of the gripper to capture images of the marks. A memory having stored data including image data of sets of prelearned positions of marks with corresponding prelearned patterns of forces, each set of prelearned positions of marks corresponds to a prelearned pattern of forces. An image processor operatively connected to the camera and the memory. The image processor is configured to detect positions of the marks in captured images. Compare the detected positions of the marks in the captured images to the sets of the prelearned positions of marks, based on a distance function, to determine a quality of match value for each set of the prelearned positions of marks. Determine a best quality matched prelearned pattern of forces using a user selected best matching function, that is applied to the determined quality of match values, to calculate a best matching set of the prelearned positions of marks and the corresponding best quality matched prelearned pattern of forces. Identify a pattern of forces acting on the elastically deformable element based on the determined best-matched prelearned pattern of forces. Output the identified pattern of forces to initiate a gripper action for the gripper based on the identified pattern of forces acting on the deformable element.

According to another embodiment of the present disclosure, a tactile sensor for a robot having a deformable element including an outer impact surface and an undersurface having pins, ridges, or both. Each undersurface pin or ridge includes a mark, and the deformable element is attached to a gripper of the robot. A camera positioned in a cavity of the gripper to capture images of the marks. A memory having stored data including image data of sets of prelearned positions of marks with corresponding prelearned patterns of forces, each set of prelearned positions of marks corresponds to a prelearned pattern of forces. The tactile sensor comprising an image processor operatively connected to the camera and the memory. The image processor is configured to detect positions of the marks in captured images. Compare the detected positions of the marks in the captured images to the sets of the prelearned positions of marks, based on a distance function, to determine a quality of match value for each set of the prelearned positions of marks. Determine a best quality matched prelearned pattern of forces using a user selected best matching function. Identify a pattern of forces acting on the deformable element based on the determined best-matched prelearned pattern of forces. Output the identified pattern of forces to initiate a gripper action for the gripper based on the identified pattern of forces acting on the deformable element.

Another embodiment of the present disclosure, a method for tactile sensing having an elastically deformable element with an outer impact surface and an undersurface having pins, ridges, or both. The undersurface pin or ridge includes a mark. The elastically deformable element is attached to a gripper of the robot. A camera positioned in a cavity of the gripper to capture images of the marks. The method comprising capturing images from the camera. Accessing a memory having stored data that includes image data of sets of prelearned positions of marks with prelearned patterns of forces, each set of prelearned positions of marks corresponds to a prelearned pattern of forces. Detecting positions of the marks in captured images. Evaluating the captured images to detect the positions of each mark in the captured images, and compare the detected positions of the mark in the captured images to the sets prelearned positions of marks of the image data, based on a distance function, to obtain a quality of match value for each set of the prelearned positions of marks. Applying a user selected best matching function to the quality of match values, to calculate a best matching set of the prelearned positions of marks and the corresponding best quality matched prelearned pattern of forces. Identifying a pattern of forces acting on the elastically deformable element based on the determined best matched prelearned pattern of forces. Outputting the identified pattern of forces to initiate a gripper action for the gripper, based on the identified pattern of forces acting on the elastically deformable element.

Another embodiment of the present disclosure includes a tactile sensor for a robot having a deformable element including an outer impact surface and an undersurface having pins, ridges, or both. Each undersurface pin or ridge includes a mark. The deformable element is attached to a gripper of the robot. A camera is positioned in a cavity of the gripper to capture images of the marks. A memory having stored data including image data of sets of prelearned positions of marks with corresponding prelearned patterns of forces, each set of prelearned positions of marks corresponds to a prelearned pattern of forces. The tactile sensor comprising an image processor operatively connected to the camera and the memory. The image processor is configured to detect positions of the marks in captured images. Compare the detected positions of the marks in the captured images to the sets of the prelearned positions of marks, based on a distance function, to determine a quality of match value for each set of the prelearned positions of marks. Determine a best quality matched prelearned pattern of forces using a user selected best matching function. Identify a pattern of forces acting on the deformable element based on the determined best-matched prelearned pattern of forces. Output the identified pattern of forces to initiate a gripper action for the gripper based on the identified pattern of forces acting on the deformable element, wherein the identified pattern of forces includes one or a combination of, a perpendicular pressure Z, a centered pressure, an offset pressure, a lateral force X, a shear force Y, torques in a pitch, a yaw, or a roll, a pinch, i.e. a pinch lateral force X, a pinch shear force Y, and a stretch force.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 1A is a schematic diagram illustrating an embodiment of an elastomeric cap configured with a gripper, according to an embodiment of the present disclosure;

FIG. 4B is a schematic diagram illustrating an embodiment of an elastomeric cap having pins on the inner surface and ridges attached to locations on the outer impact surface of the elastomeric cap, according to some embodiments of the present disclosure;

FIG. 6A and FIG. 6B, FIG. 6A is a photograph illustrating an embodiment of an elastomeric cap with an illuminated view of a pins with no pressures or forces applied to the outer impact surface (not shown) of the elastomeric cap, and FIG. 6B is the is the same view after image processing with the set of XY features detected being marked as gray circles, according to some embodiments of the present disclosure;

FIG. 6C and FIG. 6D, FIG. 6C is a photograph illustrating an embodiment of an elastomeric cap with an illuminated view of a pins with forces applied to the outer impact surface (not shown) of the elastomeric cap, and FIG. 6D is the same view after image processing with the set of XY features detected being marked as gray circles, according to some embodiments of the present disclosure;

FIG. 6E and FIG. 6F, FIG. 6E is a photograph illustrating an embodiment of an elastomeric cap with an illuminated view of a pins with torque forces applied to the outer impact surface (not shown) of the elastomeric cap, and FIG. 6F is the same view after image processing with the set of XY features detected being marked as gray circles, according to some embodiments of the present disclosure;

FIG. 6G and FIG. 6H, FIG. 6G is a photograph illustrating an embodiment of an elastomeric cap with an illuminated view of a pins with near pressures applied to the outer impact surface (not shown) of the elastomeric cap, and FIG. 6H is the same view after image processing with the set of XY features detected being marked as gray circles, according to some embodiments of the present disclosure;

FIG. 6I and FIG. 6J, FIG. 6I is a photograph illustrating an embodiment of an elastomeric cap with an illuminated view of a pins with lateral shear forces applied to the outer impact surface (not shown) of the elastomeric cap, and FIG. 6J is the same view after image processing with the set of XY features detected being marked as gray circles, according to some embodiments of the present disclosure;

FIG. 6L is the same view after image processing with the set of XY features detected being marked as gray circles, according to some embodiments of the present disclosure;

Figure 1B:
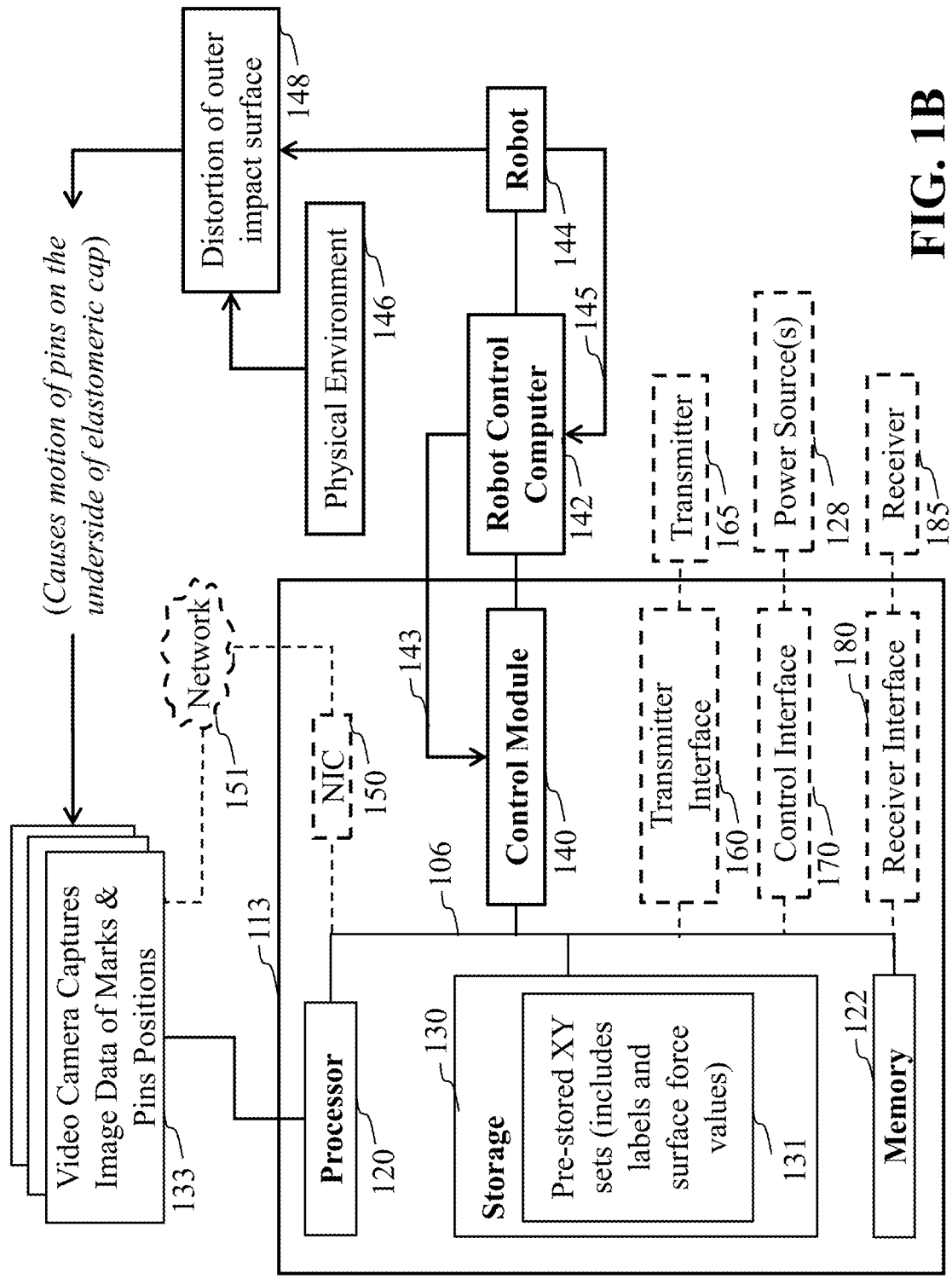
FIG. 1B is a schematic diagram illustrating some components including a sensor control computer connected to an elastomeric cap, the cap is attached to a gripper, and the gripper is part of a robot assembly, according to some embodiments of the present disclosure.

While the above-identified drawings set forth presently disclosed embodiments, other embodiments are also contemplated, as noted in the discussion. This disclosure presents illustrative embodiments by way of representation and not limitation. Those skilled in the art can devise numerous other modifications and embodiments, which fall within the scope and spirit of the principles of the presently disclosed embodiments.

DETAILED DESCRIPTION

The present disclosure relates to tactile sensing, and more particularly to a tactile sensor or an elastomeric tactile sensor having multiple micro mechanical pins attached to an underside of an elastomeric cap and upon exterior forces applied to a top surface, translates a pattern of forces into measurable quantities.

FIG. 1A is a schematic diagram illustrating an embodiment of an elastomeric cap, according to an embodiment of the present disclosure. A tactile sensor, including an elastically deformable cap 18 having a top surface 16 and an undersurface 17. The undersurface 17 includes multiple pins 13, each pin 13 includes a fiducial tip marker 15. Such that when forces are applied to the top surface 16, the elastically deformable cap 18 deforms placing the pins 13 in motion, and the fiducial tip markers 15 undergo a flexing motion. The elastomeric tactile sensor can include a camera 10 that enters a canal 11 and goes into a cavity 12a of a gripper 8. The elastomeric cap 18 connects to the cavity opening 12B of the gripper, wherein one or all of the fiducial tip markers 15 i.e. attached to the pins 13, are in view of the camera 10.

The camera 10 can be positioned in view of the fiducial tip markers 15 at an oblique angle to captures images of the fiducial tip markers 15 before, during and after, when placed in motion. The markers 15 when placed in motion, are placed in motion by a pattern of forces or a net full force tensor, when pressures, forces, torques, pinches, stretches and the like are applied to the outer impact surface 16 which corresponds to the moving the pin 13, which moves the markers 15.

FIG. 1B is a schematic diagram illustrating some components including a sensor control computer 113 connected to an elastomeric cap 16 of FIG. 1A, the cap is attached to a gripper 8 of FIG. 1A, and the gripper is part of a robot assembly, according to some embodiments of the present disclosure. The sensor control computer 113 an include a hardware processor 120 connected through bus 106 to a storage 130. The hardware processor can implement or execute stored instructions that are stored in memory 122 or storage 130, in particular, the hardware processor 120 can access the prestored XY sets 131. The storage 130 can store the prestored XY sets 131 that include labels and force values. The processor 120 is connected via the bus 106 to the memory 122. Optionally, the prestored XY sets with the labels and force values may be stored in either the storage 103, the memory 122, or both, all of which depends upon a specific application predetermined by a user.

A control Module 140 connected via the bus 106 is connected to the robot control computer 142, such that the robot control computer 143, can communicate back via 143 to the control module 140. For example, the control Module 140 can be configured from robot control computer to check the gripper force status once and report back, thereby confirming or refuting a grip, or to continuously monitor the gripper status at frame rate and interrupt the robot control when the gripper indicates either a good or an invalid grip.

Still referring to FIG. 1B, the robot control computer 142 connects to the robot 144, wherein the robot 144 can communicate back via 145 to the robot control computer 142. For example, the robot control computer 142 can command robot 144 to move, to open or close grippers.

Further, the robot 144 is connected to the distortion of outer impact surface 148, where the physical environment 146 also is connected to the distortion of the outer impact surface 148. Further, the distortion of the outer impact surface 148 is are exterior pressures or forces making up a pattern of forces or a net force tensor, that causes motion of the pins. Wherein at least one video camera 133 captures images of the marks and pins positions to obtain video image data. For example, the distortion of the outer impact surface 148 can be from exterior pressures, forces and the like, being applied to the outer impact surface 16 of FIG. 1A. The external or exterior pressures, forces and the like, can be a pattern of forces that embodiments of the present disclosure can determine an amount of measurable sensitivity for each pressure or force of the pattern of forces being externally applied to the outer impact surface 16 of FIG. 1A.

Still referring to FIG. 1B, optionally, the sensor control computer 113 can include a network interface controller 150 is adapted to connect the system 100 through the bus 106 to a network 151 connecting the control system 100 with a wireless system, that can receive wirelessly the video camera image data 133 of the captured images of the marks and pins positions, as well as other data. Also optionally, the sensor control system via the bus 106 can include a transmitter interface 160 connected to a transmitter 165, to transmit wirelessly data to a remote robot control computer (not shown), remote robot (not shown) or even a remote control module (not shown). Further still, the sensor control system 113 via bus 106 can be connected to a control interface connected to one or more power source 128. The control interface can provide data including action commands to the power source or other devices. Contemplated is that the power source(s) 128 could be one or a combination of a battery, alternate power source, 120-volt source, an alternative energy source, (i.e. sun, water, wind, etc.). In addition, the sensor control computer via bus 106 can include a receiver interface 180 connected to a receiver 185, to receive video image data or other data.

Figure 1C:
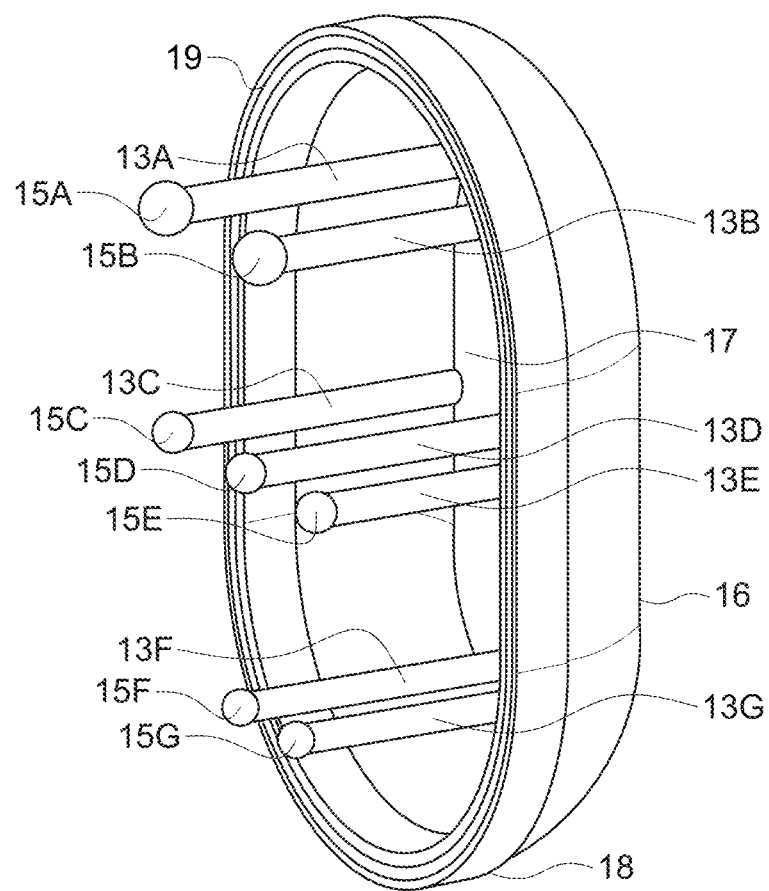
FIG. 1C is a schematic diagram illustrating an embodiment of an elastomeric cap, according to some embodiments of the present disclosure.

FIG. 1C is a schematic diagram illustrating an embodiment of the elastomeric cap of FIG. 1A, according to some embodiments of the present disclosure. The elastomeric cap 18 includes the outer impact surface 16, the undersurface 17, pins 13A-13G and markers 15A-15G located on the pins 13A-13G. Contemplated is that the rim 19 or radius of the elastomeric cap 18 can be structured to mount to a gripper mounting surface (see FIG. 1D). Of course, the rim or radius can be structured in a different structural configuration to be attachable to another type of mounting structure, depending upon a specific application predetermined by a user.

In regard to some elastomeric cap 18 configurations according to some embodiments, the elastomeric cap 18 includes the multiple micro mechanical pins 13A-13G positioned on an underside of the elastomeric cap 17. Each micro mechanical pin (hereafter "pin") 13A-13G can extend from and outward away from the underside 17 of the cap. Positioned on an outer most end (away from the underside) on the pin 13A-13G, a mark(s) or a fiducial tip marker (white or colored paint or retroreflective paint) 15A-15G has motion damped only by air. The markers 15A-15G can be positioned anywhere on the pin, depending upon the specific application.

Still referring to FIG. 1C, the pins 13A-13G can be made of an elastomer material, such as silicone rubber, polyurethane, thermoplastic elastomer, natural rubber, polyisoprene, polyamide (nylon), polyethylene, polypropylene polyvinyl chloride, plasticized photo-polymerized acrylic or a mixture thereof. The outer impact surface 17 of the elastomeric cap 18 can be made of a deformable material or materials. By non-limiting example, the elastomeric cap 18 can be made of silicone rubber, polyurethane, thermoplastic elastomer, natural rubber, polyisoprene, polyvinyl chloride, plasticized photo-polymerized acrylic, etc. such that it is contemplated the pins 13A-13G can be made of the same material as the elastomeric cap 18 or of a different material or combination of materials. For example, the pins 13A-13G might be made of nylon and the body of the cap 18 and impact surface 16 can be made of polyurethane and fabricated as a double-shot injection molding.

As noted above, the pins 13A-13G translate something hard to measure, such as a pattern of forces or net force tensor, into something easy to measure. That is, measuring is made easier based upon image motion of the free micro mechanical pin tips or ends 15A-15G, i.e. the image motion of the mark 15A-15G at the outer most end of the pin, is tracked by a camera, such as an inexpensive webcam, that views the pin tip at some angle. The pins tips 15A-15G can be continuously viewed by the camera prior to the motion of the pin tip, i.e. before forces are applied on the outer impact surface of the elastomeric cap, during motion of the pin tip, i.e. while the forces are being applied to the outer impact surface 16 of the elastomeric cap 18, and after the motion of the pin tip has stopped, i.e. after the externally applied forces have stopped.

Figure 1D:
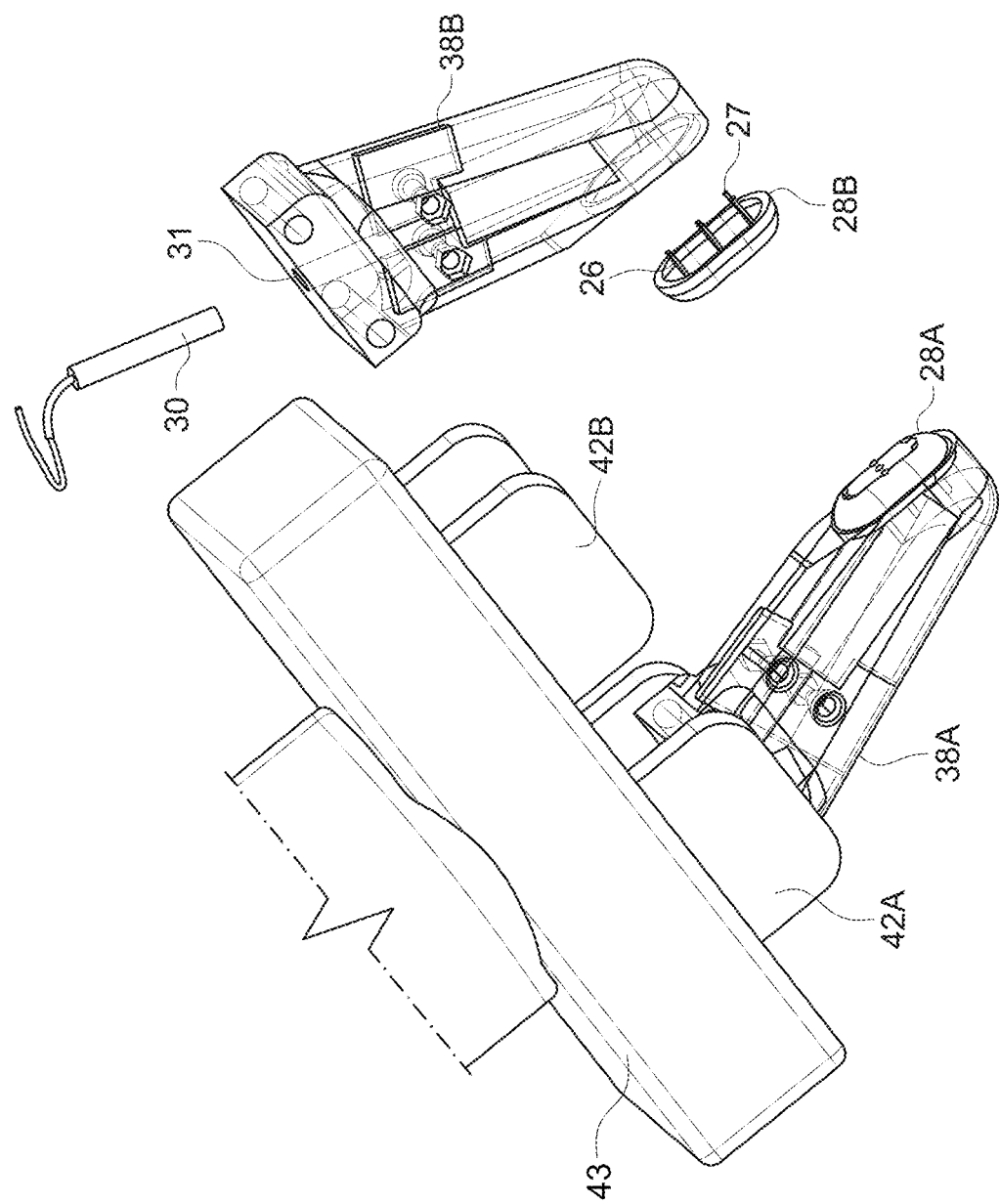
FIG. 1D is a schematic diagram illustrating an embodiment of an elastomeric cap configured with a gripper, according to an embodiment of the present disclosure.

FIG. 1D is a schematic diagram illustrating an embodiment of an elastomeric cap configured with a gripper, according to an embodiment of the present disclosure. The gripper assembly 43 can include two fingers or grippers 38A, 38B, each gripper includes an elastomeric cap 28A, 28B attached to the gripper 38A, 38B. The gripper assembly 43 can have extending mounting structures 42A, 42B for attaching the fingers or grippers 38A, 38B to the gripper assembly 43. The attaching can be by mechanical devices, including bolts, screws, etc. or by magnetic devices, or by some other attaching arrangements. In addition, the gripper 38B shows that a camera 30 can be inserted into a channel 31 to be positioned in the gripper 38B in order to view pins 26 of the elastomeric cap 28B for capturing images of the pins 26 and markers 27 positions.

Contemplated is that there can be multiple cameras each having overlapping views of the marks, wherein the cameras include an illumination source. The illumination source is an artificial source of visible illumination, or an observable property and effect of light that can be part of the camera or not a part of the camera and mounted separately. In addition, depending on the application predetermined by a user, the markers can include different mark types including different sized, shaped, or colors. For example, the markers can be white, such as white "liquid paper" paint (as used in some of our experiments), or some type of retroreflector (sometimes called a retroflector or cataphote) that can be a device or surface that reflects radiation (light, usually) back to its source (or camera) with a minimum of scattering. In a retroreflector the wavefront of the radiation is reflected straight back to the wave's source or to a camera. This works at a wide range of angle of incidence, unlike a planar mirror, which does this only if the mirror is exactly perpendicular to the wave front, having a zero angle of incidence. Being directed, the retroflector's reflection is brighter than that of a diffuse reflector. Microbeaded paints and coatings are often used as flexible or paint-on retroreflector materials, in safety vests, jogger's clothing, backpacks, and high-visibility highway markings.

Still referring to FIG. 1D, some aspects of the different types of marks is that different types of lighting can be used to illuminate or measure the mark motion. For example, the different types of lighting can each be associated with a corresponding mark that allows for measuring of the mark by capturing an image from a camera. Further, the lighting can include the visible spectrum visible to the human eye and by a camera. Visible light is usually defined as having wavelengths in the range of 400-700 nanometers (nm), or $4.00 \times 10^{-7}$ to $7.00 \times 10^{-7}$ in, between the infrared (with longer wavelengths) and the ultraviolet (with shorter wavelengths). This wavelength means a frequency range of roughly 430-750 terahertz (THz). Depending upon the specific application, the lighting can be all types of electromagnetic radiation (EMR), if the user has an unlimited expense account, other components can be used in order to utilize the type of EMR, according to the specific application.

Figure 2A:
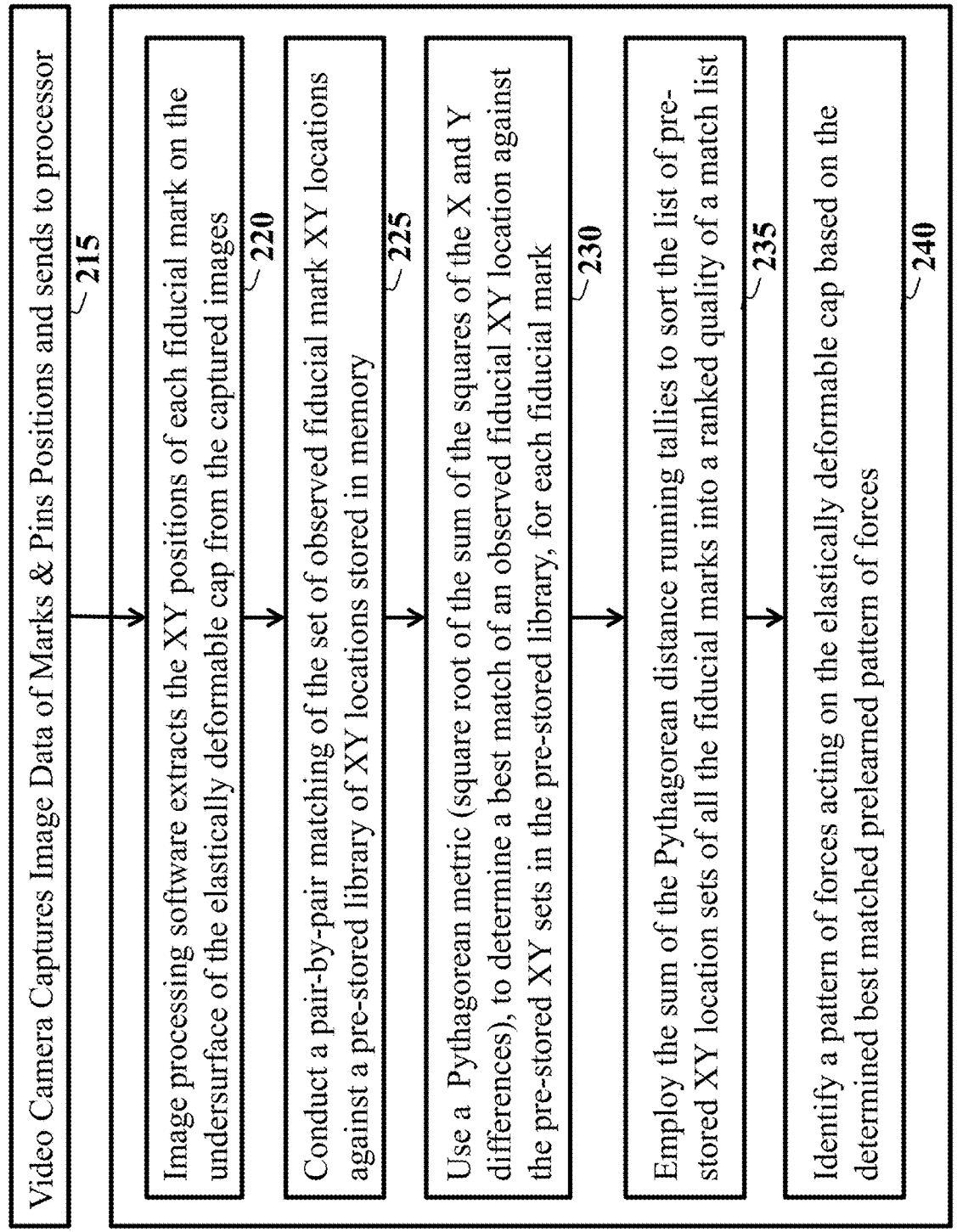
FIG. 2A and FIG. 2B are a flow diagrams illustrating embodiments of some steps for implementing a method, according to some embodiments of the present disclosure.
Figure 2B:
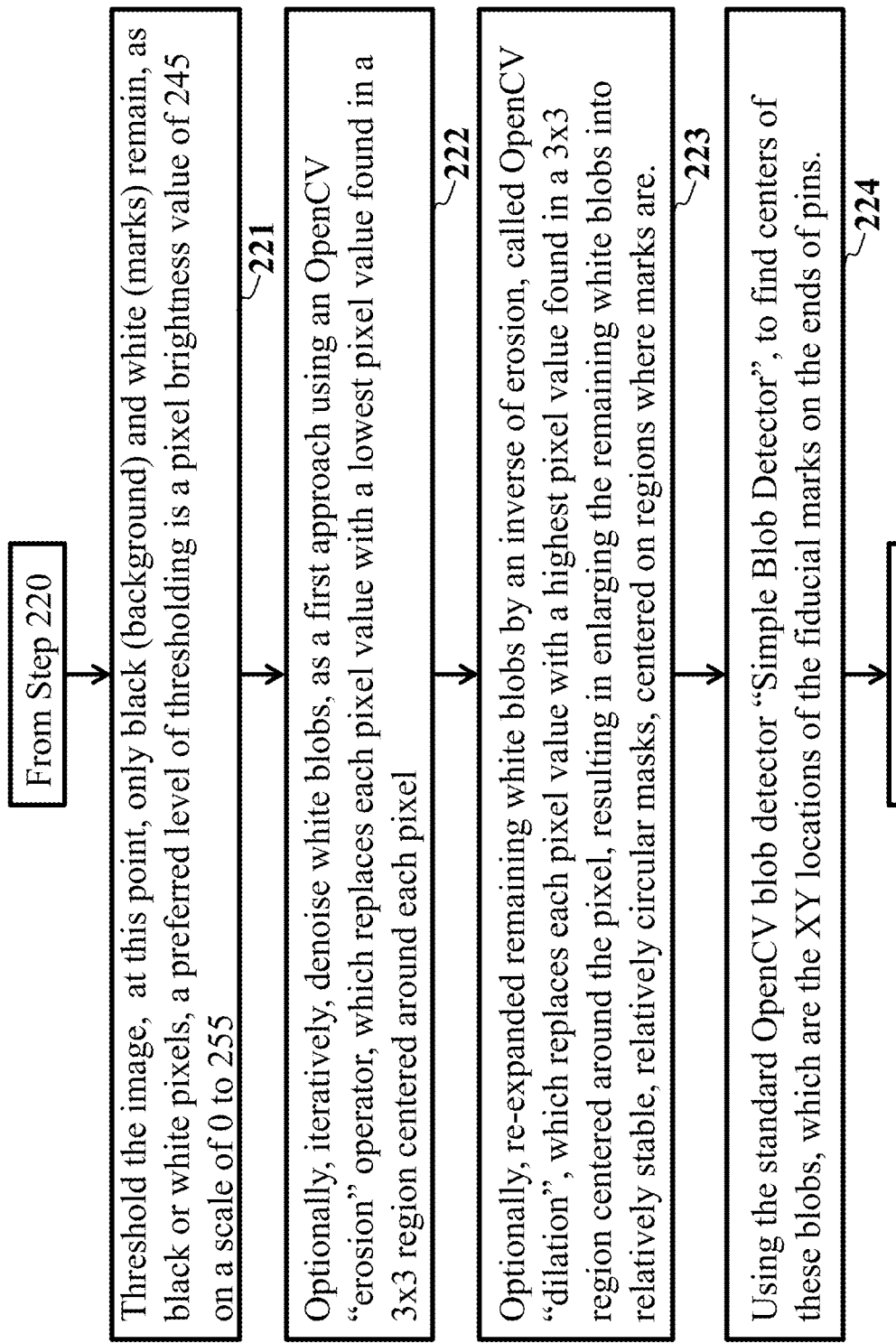

FIG. 2A and FIG. 2B are a flow diagrams illustrating embodiments of some steps for implementing a method, according to some embodiments of the present disclosure.

Step 215 of FIG. 2A includes capturing images of fiducial tip markers in motion from start to final end points using a camera(s), video camera(s) or web cam(s). For example, the fixed camera captures images of the microlever pins carrying the fiducial marks. The images are sent to a computer or processor, wherein an inexpensive webcam camera can be connected via USB to the computer running software such as Debian Linux software, as according to at least one experiment. However, clearly other experiments can include different types of cameras, camera positions, camera mounting arrangements, as well as other types of software.

Step 220 of FIG. 2A includes identifying measured image coordinates of locations in images of the captured images. On the computer, the image processing software can be used to extract the XY positions of each fiducial marker positioned on the undersurface of the cap. Obviously, many different but similar methods exist, but the preferred method included using an open-source package "OpenCV". Realized is that not every mark needed to be in view of the camera, depending upon the specific application. Initially, during this experimentation color, webcam image had been reduced some to a grayscale image, but this is not required, and is optional.

Referring to FIG. 2B, optionally, step 221 can include a method step used to threshold the image. At this point, only black (the background) and white (the fiducial marks) remain, as black or white pixels. A preferred level of thresholding is a pixel brightness value of 245 on a scale of 0 to 255, by non-limiting example. This approach appeared to present the fiducials as white irregular blobs in a black field, along with specks of white from noise or fabric lint contamination in the sensor.

Also, referring to FIG. 2B, optionally, step 222 can include a method step used to denoise the white blobs, a first approach by the OpenCV "erosion" operator, replaced each pixel value with a lowest pixel value found in a 3×3 region centered around each pixel. This erosion approach was performed three times, which removed noise pixels and lint contamination from the image; this was because these noise features are generally less than six pixels across.

Also, referring to FIG. 2B, optionally, step 223 can include a method step used to reexpand the remaining white blobs by an inverse of erosion, called OpenCV "dilation". Which replaced each pixel value with a highest pixel value found in a 3×3 region centered around the pixel. That resulted in enlarging the remaining white blobs into relatively stable, relatively circular masks, centered on regions where the fiducial marks are. We then use this mask image with the grayscale image to eliminate essentially all of the noise and contamination from the grayscale image, because areas/regions/places where the erode/dilate processed, did not recover a stable area are black (zero) and when logic-ANDed with the original image, yields a black background that makes marker detection fast and with very low noise.

Also, referring to FIG. 2B, optionally, step 224 can include a method step using the standard OpenCV blob detector "Simple Blob Detector", to find centers of these blobs, which are the XY locations of the fiducial marks on the ends of the microlever pins.

There are many ways to implement blob detection. For sake of an easily understood example, consider a simple round blob detector suitable for the step 224 of FIG. 2B of finding bright round blobs on a dark background.

The simple blob detector works as follows: for each pixel in the input image, sum the values of all pixels inside a circular radius of R1 pixels; call this sum SUM1. Then, sum the values of all pixels within radius R2 pixels but outside of the R1 radius; that is, the sum of all pixel values within an R1 to R2 annulus. Call this sum SUM2. The output value of for the original pixel is SUM1-SUM2. We repeat this summation process for each pixel in the input image.

Now assume we set R2 to be the square root of 2 (approximately 1.414) times R1, we see that the areas of the R1 circle and the R2 annulus ring are equal. Since the area of the R1 circle and the area of the R2-R1 annulus are equal, then on average, for a uniform (but noisy) image, the sums of the R1 circle SUM1 and the R2-R1 annulus SUM2 will be very nearly equal, and the value SUM1 minus SUM2 will be very close to zero.

For the sake of convenience, we will term this center minus ring summation operation over an image as a Circle Minus Ring Filtering, or CMRF; which accepts an incoming image, performs a circle-minus-ring operation centered on each pixel, and returns the result. Unless otherwise specified, the CMRF function for a radius R1 will default to an R2=SQRT(2)*R1. Note that the raw returned result of a CMRF pixel may exceed 8 bits (a value of 255); for the purposes of this explanation we will assume that the returned image allows multi-byte values. Other more advanced methods may scale or renormalize but discussion of those methods is both beyond the scope of this explanation and available in the public literature.

We then test our CMRF on an input image with one single white pixel, and observe the output pixels on and around our original white pixel. If R1=1 then the R1 circle contains five pixels, R2 is 1.414, and there are four pixels in the R1-R2 ring, and our output blob-detected image SUM1 minus SUM2 is black (zero) everywhere except within a region within one pixel of our test white pixel, where it has the value of white (which, in a one-byte-per-pixel black and white image, would be 255).

Now note the behavior of this detector as we increase R1 and R2, keeping R2 to the value R1*SQRT(2). As we increase the radii of the R1 circle and R2-R1 annulus ring, a larger and larger circle of white will appear, centered on the single white pixel. However, the CMRF value SUM1 minus SUM2 will not increase with increasing R1; it remains at 255.

We repeat this experiment with a white circle of radius 5 on a black background, and increasing the value of R1 (and R2) from 1, to 2, to 3 . . . and so on. We then see that for values of R1 from 1 to 5, the maximum CMRF value of SUM1 minus SUM2 found increases from 1 to 20,000 (depending on your circle drawing algorithm), then for R1 of 6 or greater, no further increase in the CMRF SUM1 minus SUM2 is seen.

We also note that the pixel at the maximum value of SUM1 minus SUM2 is the center of our blob. Moving even one-pixel step away moves some white (value 255) pixels out of the SUM1 (positive contribution) region, and into the SUM2 (negative contribution) region of the CMRF. Thus finding the pixel with the maximum CMRF value will find the center of a blob.

From this we now see how to detect a single blob. We perform the CMRF repeatedly, varying R1 from slightly below a pre-chosen minimum blob radius R1min, to slightly above a pre-chosen maximum blob radius R1max. The pixel with the maximum CMRF value is the center of the blob; the value of R1 when that value is found is the radius of the blob.

In the case of multiple blobs, the same process suffices, with one change. Instead of choosing the single pixel with the maximum CMRF value over the whole image, we look for the maximum CMRF value within a particular radius R exclusion, and above a convenient threshold T percent. Thus, more than one blob may be found, or no blobs at all.

In our experiments, an Rmin of ~5 pixels, an Rmax of ~20, a blob exclusion radius of Rmax, and a T percent threshold of 90% (that is, the blob CMRF value must be at least 90% of the maximum possible for an all-white circular blob).

We emphasize that this is only a very simplified method given for the sake of completeness, and better (but more complicated) methods are published in open literature and available in the OpenCV open-source software, which may be used in step 224.

Referring to FIG. 2A, step 225 includes determining a set of relative positions of the fiducial marks in the captured images. For example, because the number of such XY pairs is equal to the number of fiducial marks, and is small (for these experiments, just seven fiducial pins were used), the next step 225 can be to do a pair-by-pair matching of the set of observed fiducial mark XY locations against a pre-stored library of XY locations.

The pre-stored library of XY location was earlier produced through a course of many experiments. For this particular set of experiments fewer than 50 pre-stored XY sets where stored in a memory in the pre-stored library database, that resulted in giving excellent resolution and usability. Of course, that more than 50 pre-stored XY sets can be stored in the pre-stored library database, however, for these sets of experiments, 50 pre-stored XY sets appeared to be sufficient to reach some of the goals according to some aspects of the present disclosure.

Step 230 of FIG. 2A includes steps of how to figure out a pattern of forces or determining a net force tensor acting on the top surface of the elastically deformable cap. As a general overview the pattern of forces can be determined by matching the set of relative positions of the fiducial tip markers to a stored set of previously learned relative positions of the fiducial tip markers placed in motion, and then identifying the pattern of forces associated with the stored set of previously learned relative positions of the fiducial tip markers.

Thus, step 230 of FIG. 2A begins with a method step using a Pythagorean metric (square root of the sum of the squares of the X and Y differences); to determine a best match of an observed fiducial XY location against the pre-stored XY sets in the library. This computation was very fast; each of the observed XY locations was compared to every pre-stored XY location in the pre-stored library; a "running tally" for each of the 50 or so pre-stored sets was maintained on an assumed basis that every fiducial mark is represented in each of the pre-stored sets once, so each pre-stored set running tally was incremented by the Pythagorean distance between the observed XY fiducial location and the nearest pre-stored XY location of any fiducial within any given pre-stored set. While conducting experimentation for this step, initially there was an assumption for the need or a necessity, to track individual marks over time (i.e. the leftmost mark in the front row corresponds to the fourth XY coordinate in the fourth pre-stored library set, etc.), However, later experimentation showed this assumption was completely an unnecessary computation, and that this can be omitted without loss of accuracy.

Still referring to step 230 of FIG. 2A, a surprising result from this experimentation is that this computation was exceptionally fast; with 10 fiducial marks and 100 pre-stored library sets, there are 1000 XY pair-to-pair comparisons, which is 2000 squares, 1000 adds, and 1000 square roots or ~4000 floating point operations in total. Which meant, and realized is that this is highly tractable method, with fantastic results, in view of the process configuration for even a most inexpensive microprocessor to perform, at well above a camera frame rate.

Step 235 of FIG. 2A includes can include a method step employing the sum of the Pythagorean distance running tallies to sort the list of pre-stored XY location sets into a ranked quality of a match list.

In some applications, a single best match is the only one desired and output by the sensor processing. For example, "GRIP OK" versus "NO OBJECT FOUND" versus "GRIP TOO TIGHT" versus "GRIP ON EDGE" might be labels for some of the stored XY location sets, and so those would be output by the sensor processor. It should be noted that there is no prohibition on having multiple stored XY location sets that have the same label; there might be five or ten "GRIP ON EDGE" possibilities, and based on the application, it might not be necessary or even useful for the downstream systems to know exactly which one.

Still referring to step 230 of FIG. 2A, in other applications, may depend on choosing to output a sensor result that is some particular weighting, inverse weighting, or linear combination of the forces that were in effect when a particular stored XY location set was recorded. For example, if downward forces at 1, 2, 5, and 10 newton's were recorded, and the corresponding fiducial XY location sets stored, and then the sensor was subject to an unknown force, an image might be captured, where the image is processed as described above, to obtain Pythagorean distances, and then can be proceeded as follows:

Pythagorean distance to 1 newton stored XY set=350
Pythagorean distance to 2 newton stored XY set=100
Pythagorean distance to 5 newton stored XY set=50
Pythagorean distance to 10 newton stored XY set=400
. . . which then might be calculated as follows:
   sum of inverses of weights=1/350+1/100+1/50+1/400=0.0353
   weighting of 1 newton sample=1*[1/350]/0.0353=0.080
   weighting of 2 newton sample=2*[1/100]/0.0353=0.566
   weighting of 5 newton sample=5*[1/50]/0.0353=2.832
   weighting of 10 newton sample=10*[1/400]/0.0353=0.708
   total weighted sum: 4.186
. . . indicating an approximate force of 4.186 newton's on the elastomeric cap's sensing surface.

This same process can be extended to multiple forces operating singly or in combination, such as 1, 2, 5, 10 newton's of downforce, −10, −5, −2, −1, 0, 1, 2, 5, and 10 newton's of shear in X, −10, −2, 2 and 10 newton's of shear in Y, and −10, −2, +2, and +10 newton's of torque in Z.

Still referring to step 230 of FIG. 2A, it is also reasonable to limit the number of stored XY sets to be evaluated in the weighting, inverse weighting, or linear interpolation; typically, the best-matching (lowest Pythagorean distance) two or three stored XY location sets give the best accuracy for 1-dimensional problems, and four to six for two-dimensional, six to eight for three dimensional, and so on. The methods of the present disclosure as you can see are highly customizable to a user's specific application needs/requirements, all while using very inexpensive components along with using an inexpensive microprocessor to perform, at well above a camera frame rate.

Still referring to step 230 of FIG. 2A, an aspect may appear that this problem could be an inverse finite element modeling, however, experimentation later showed that for robotic gripper caps on a scale of a human thumb, between 300 and 1000 mesh points (each with three degrees of freedom) that are required for adequate fidelity in a linear finite element model (and many more if we allow nonlinearities). Meant that this means the computational phase includes solving up to a 3000×3000 system of linear equations at the video camera frame rate, which is certainly expensive computationally, if not outright impossible with current conventional tactile sensor technologies.

Figure 2C:
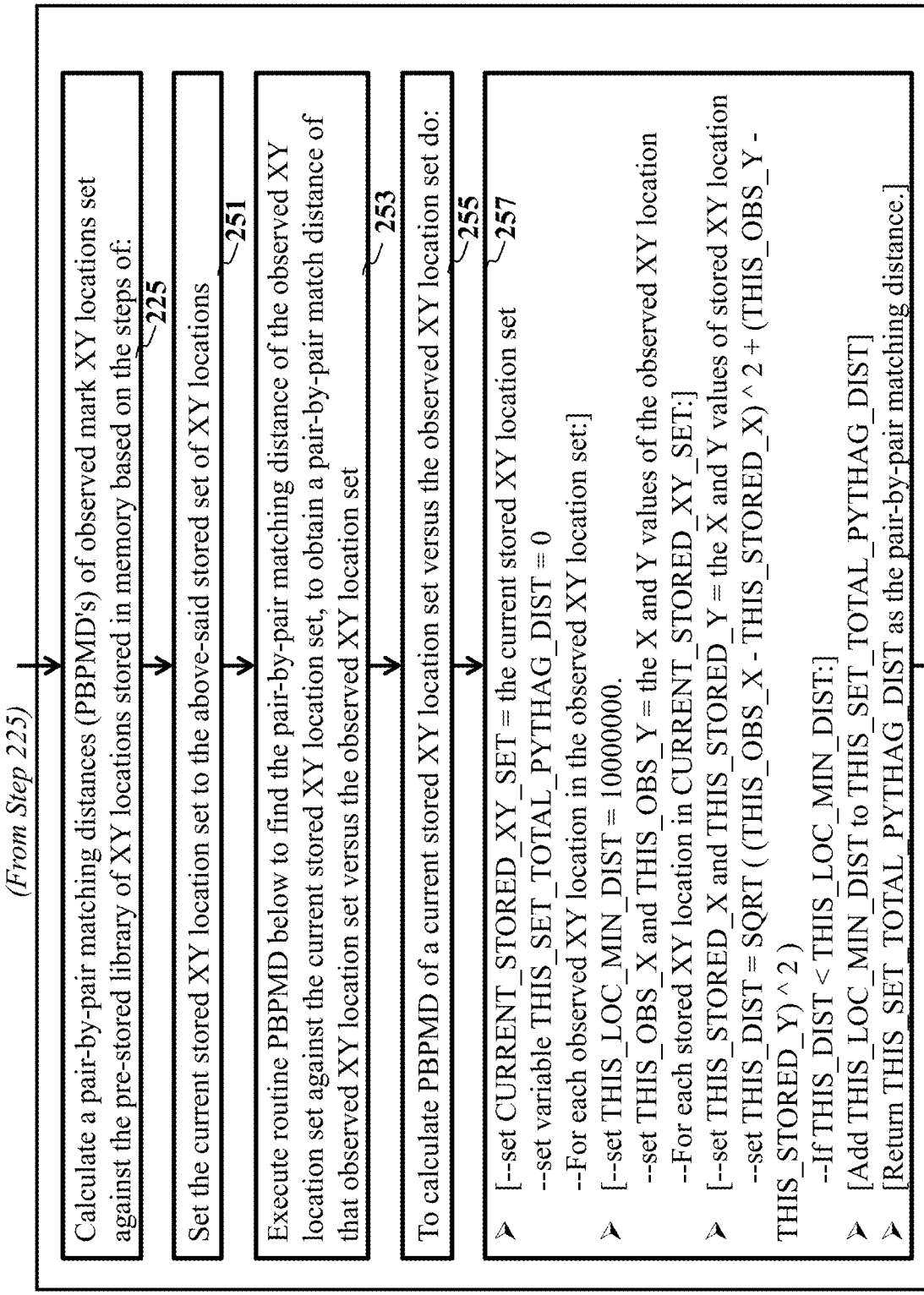
FIG. 2C is a block diagram illustrating some steps for conducting a pair-by-pair matching of the set of observed fiducial mark XY locations against a pre-stored library of XY locations stored in memory of step 225 of FIG. 2A, according to some embodiments of the present disclosure.

FIG. 2C is a block diagram illustrating some steps for conducting a pair-by-pair matching (step 225 of FIG. 2A) of the set of observed fiducial mark XY locations against a pre-stored library of XY locations stored in memory of step 225 of FIG. 2A, according to some embodiments of the present disclosure. Calculate a pair-by-pair matching distances (PBPMD's) of observed mark XY locations set against the pre-stored library of XY locations stored in memory based on the steps of:

Step 251 of FIG. 2C includes Set the current stored XY location set to the above-said stored set of XY locations.

Step 253 of FIG. 2C includes Execute routine PBPMD below to find the pair-by-pair matching distance of the observed XY location set against the current stored XY location set, to obtain a pair-by-pair match distance of that observed XY location set versus the observed XY location set.

Step 255 of FIG. 2C includes to calculate PBPMD of a current stored XY location set versus the observed XY location set do:

Step 257 of FIG. 2C includes:
[--set CURRENT_STORED_XY_SET=the current stored XY location set
   --set variable THIS_SET_TOTAL_PYTHAG_DIST=0
   --For each observed XY location in the observed XY location set:]
[--set THIS_LOC_MIN_DIST=10000000.
   --set THIS_OBS_X and THIS_OBS_Y=the X and Y values of the observed XY location
   --For each stored XY location in CURRENT_STORED_XY_SET:]
[--set THIS_STORED_X and THIS_STORED_Y=the X and Y values of stored XY location
   --set THIS_DIST=SQRT ((THIS_OBS_X−THIS_STORED_X)^2+(THIS_OBS_Y−THIS_STORED_Y)^2)
   --If THIS_DIST<THIS_LOC_MIN_DIST:]
[Add THIS_LOC_MIN_DIST to THIS_SET_TOTAL_PYTHAG_DIST]
[Return THIS_SET_TOTAL_PYTHAG_DIST as the pair-by-pair matching distance.]

Figure 2D:
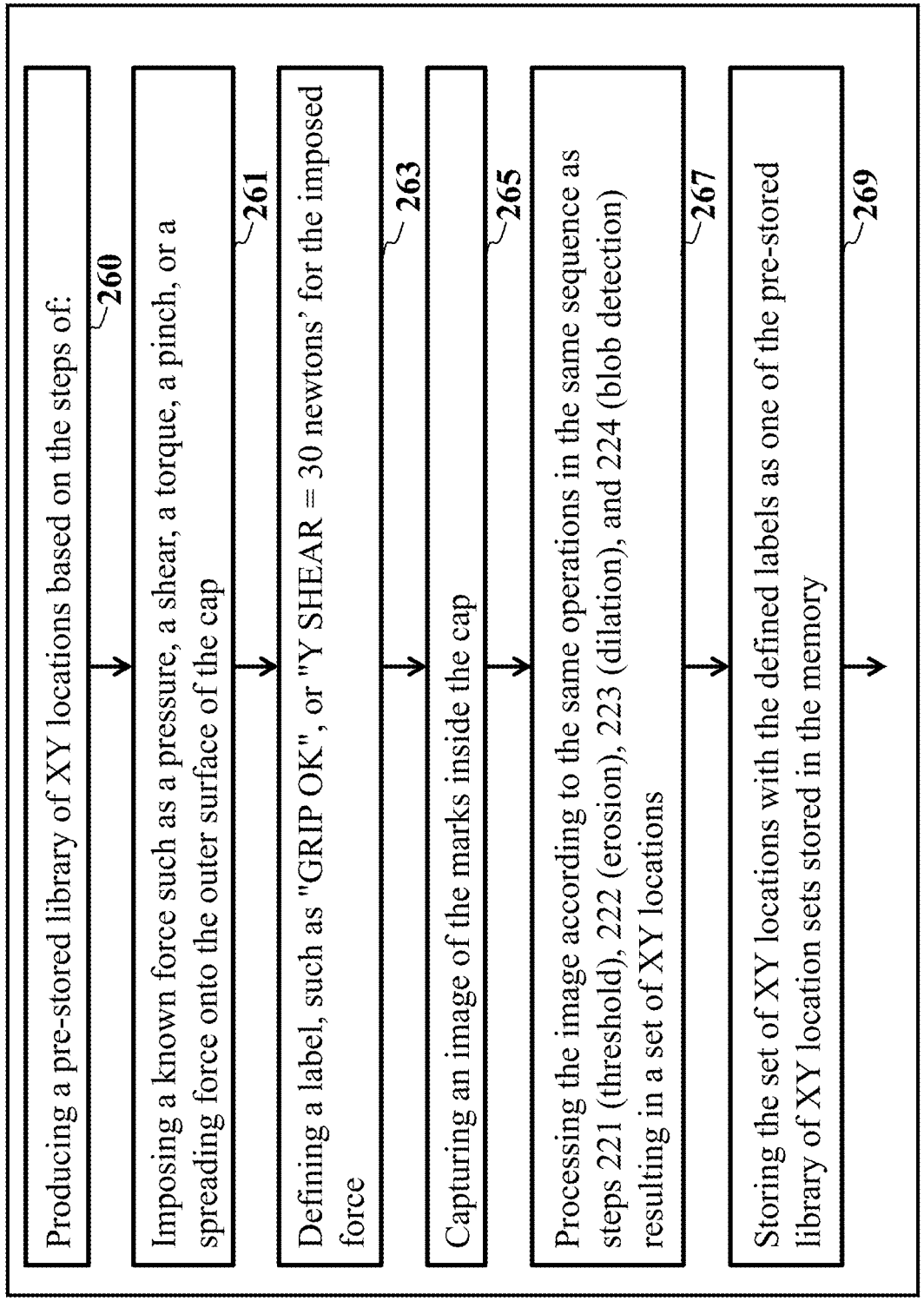
FIG. 2D is a block diagram illustrating some steps for producing a prestored library of XY locations, according to some embodiments of the present disclosure.

FIG. 2D is a block diagram illustrating some steps for producing a prestored library of XY locations, according to some embodiments of the present disclosure. Producing a prestored library of XY locations 260 can include step 261 that includes imposing a known force such as a pressure, a shear, a torque, a pinch, or a spreading force onto the outer surface of the cap.

Step 263 of FIG. 2D includes defining a label, such as "GRIP OK", or "Y SHEAR=30 newton's for the imposed force.

Step 265 of FIG. 2D includes capturing an image of the marks inside the cap.

Step 267 of FIG. 2D includes processing the image according to the same operations in the same sequence as steps 221 (threshold), 222 (erosion), 223 (dilation), and 224 (blob detection) resulting in a set of XY locations.

Step 269 of FIG. 2D includes storing the set of XY locations with the defined labels as one of the pre-stored library of XY location sets stored in the memory.

Figure 2E:
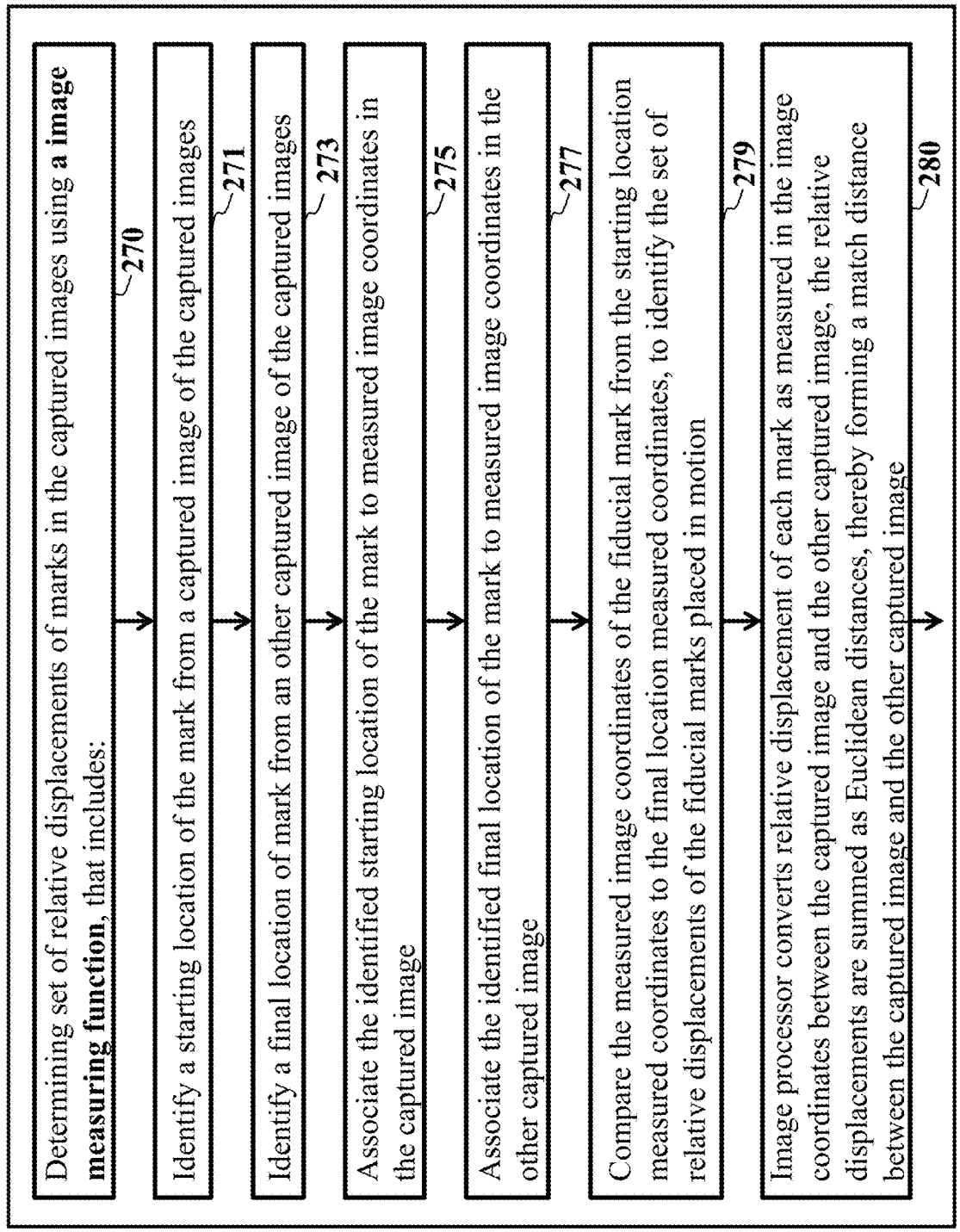
FIG. 2E is a block diagram illustrating some steps for using an image measuring function, according to some embodiments of the present disclosure.

FIG. 2E is a block diagram illustrating some steps for using an image measuring function 270, according to some embodiments of the present disclosure. Step 271 that includes identifying a starting location of the mark from a captured image of the captured images.

Step 273 of FIG. 2E includes identifying a final location of mark from an other captured image of the captured images.

Step 275 of FIG. 2E includes associating the identified starting location of the mark to measured image coordinates in the captured image.

Step 277 of FIG. 2E includes associating the identified final location of the mark to measured image coordinates in the other captured image.

Step 279 of FIG. 2E includes comparing the measured image coordinates of the fiducial mark from the starting location measured coordinates to the final location measured coordinates, to identify the set of relative positions of the fiducial marks placed in motion.

Step 280 of FIG. 2E includes using the image processor to convert the relative position of each mark as measured in the image coordinates between the captured image and the other captured image, the relative positions are summed as Euclidean distances, thereby forming a match distance between the captured image and the other captured image.

Figure 3A:
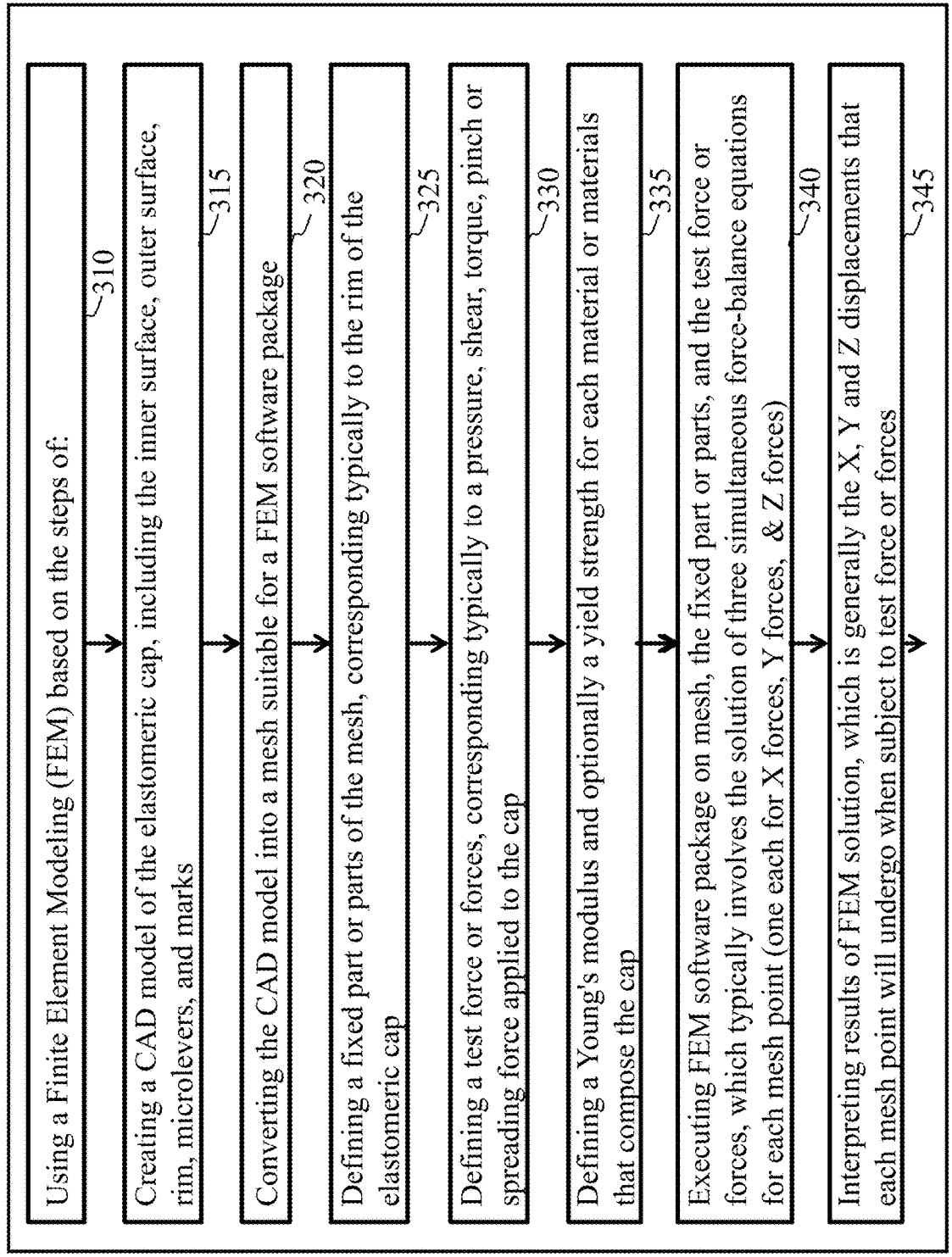
FIG. 3A is a flow diagram illustrating some steps of a Finite Element Modeling (FEM), according to some embodiments of the present disclosure.

FIG. 3A is a flow diagram illustrating some steps of using a Finite Element Modeling (FEM) 310, according to some embodiments of the present disclosure. The FEM is an excellent venue to show or illustrate that a measure of sensitivity of the elastic deformation of the top surface of the elastomeric cap is magnified and greater using the multiple pins on the undersurface of the elastomeric cap, when compared to an amount of measurable sensitivity of a motion of the deflection of "only" the outer impact surface of the elastomeric cap. For example, Step 315 that includes creating a CAD model of the elastomeric cap, including the inner surface, outer surface, rim, microlevers, and marks.

Step 320 of FIG. 3A includes converting the CAD model into a mesh suitable for a FEM software package.

Step 325 of FIG. 3A includes defining a fixed part or parts of the mesh, corresponding typically to the rim of the elastomeric cap.

Step 330 of FIG. 3A includes defining a test force or forces, corresponding typically to a pressure, shear, torque, pinch or spreading force applied to the cap.

Step 335 of FIG. 3A includes defining a Young's modulus and optionally a yield strength for each material or materials that compose the cap Step 340 of FIG. 3A includes executing the FEM software package on the mesh, the fixed part or parts, and the test force or forces, which typically involves the solution of three simultaneous force-balance equations for each mesh point (one each for X forces, Y forces, and Z forces).

Step 345 of FIG. 3A includes interpreting the results of the FEM solution, which is generally the X, Y and Z displacements that each mesh point will undergo when subject to the test force or forces.

Figures 3B, 3C:
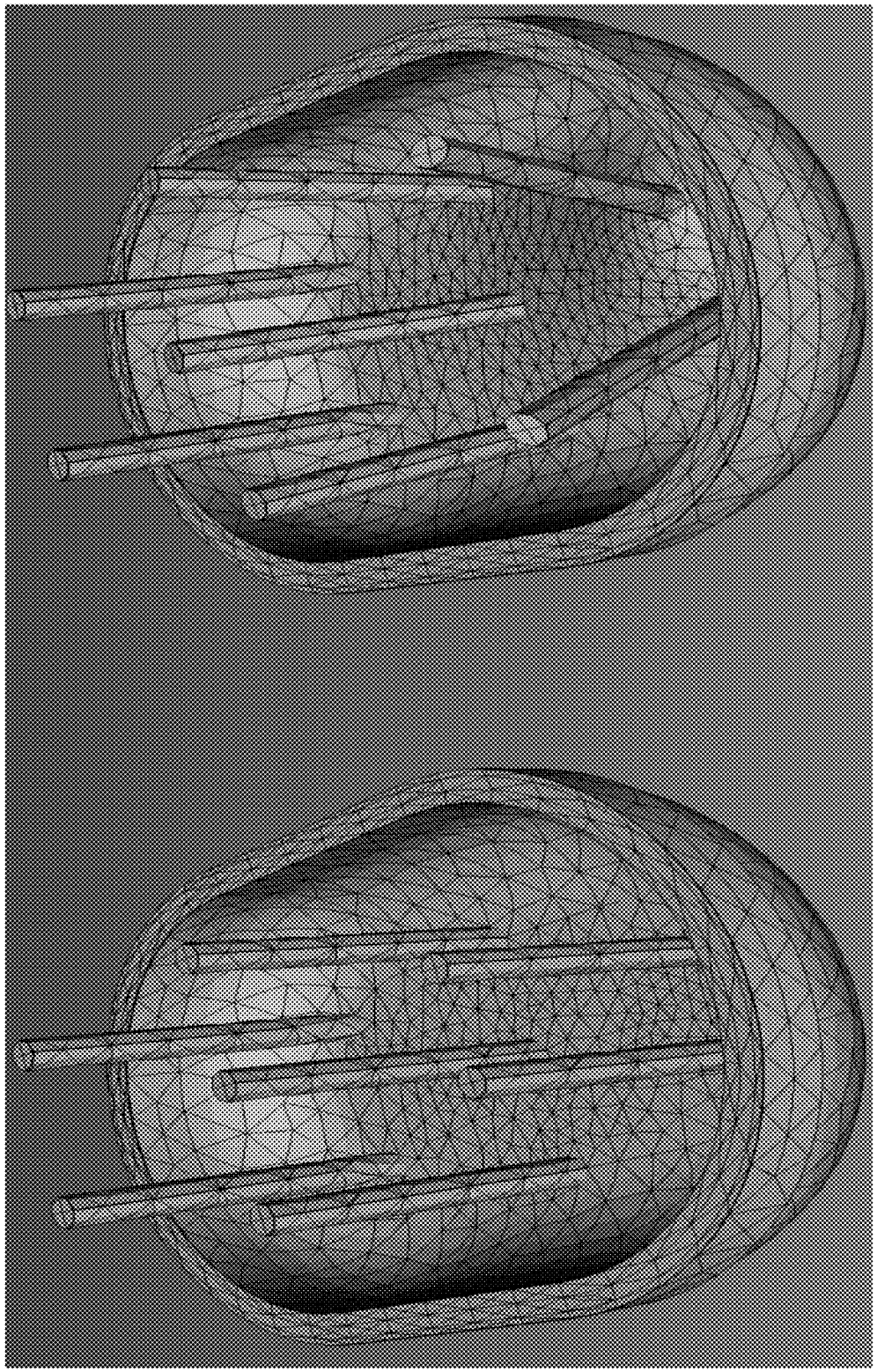
FIG. 3B and FIG. 3C are schematic diagrams illustrating aspects of the using the FEM of FIG. 3A, according to some embodiments of the present disclosure.

FIG. 3B and FIG. 3C are schematic diagrams illustrating aspects of the using a Finite Element Modeling (FEM) of FIG. 3A, according to some embodiments of the present disclosure. For example, FIG. 3B illustrates a CAD model of an elastomeric cap, with the mesh of fine lines showing the mesh that will be used for Finite Element Modeling. Within each short line in the mesh, the behavior of the material is assumed to be linear.

FIG. 3C illustrates the results of the FEM solution of the CAD model in 3B, with the material set to be an elastomer, with Shore durometer stiffness of 80A (approximately equal to the rubber used in the soles of hiking boots), the fixed part of the mesh being the rim of the cap, and the test force being vertically UP under the rightmost foreground microlever pin. Note that although the rightmost foreground microlever tip has a large motion, the adjacent left foreground microlever tip has an even larger motion. This is due to the tip and tilt distortion in the cap due to the stress of the test force. The base of the left microlever moves much less vertically than the base of the right microlever, but the overall motion is far greater, and the motion is mostly in the –X direction. This makes disambiguation of different forces possible.

Figure 4A:
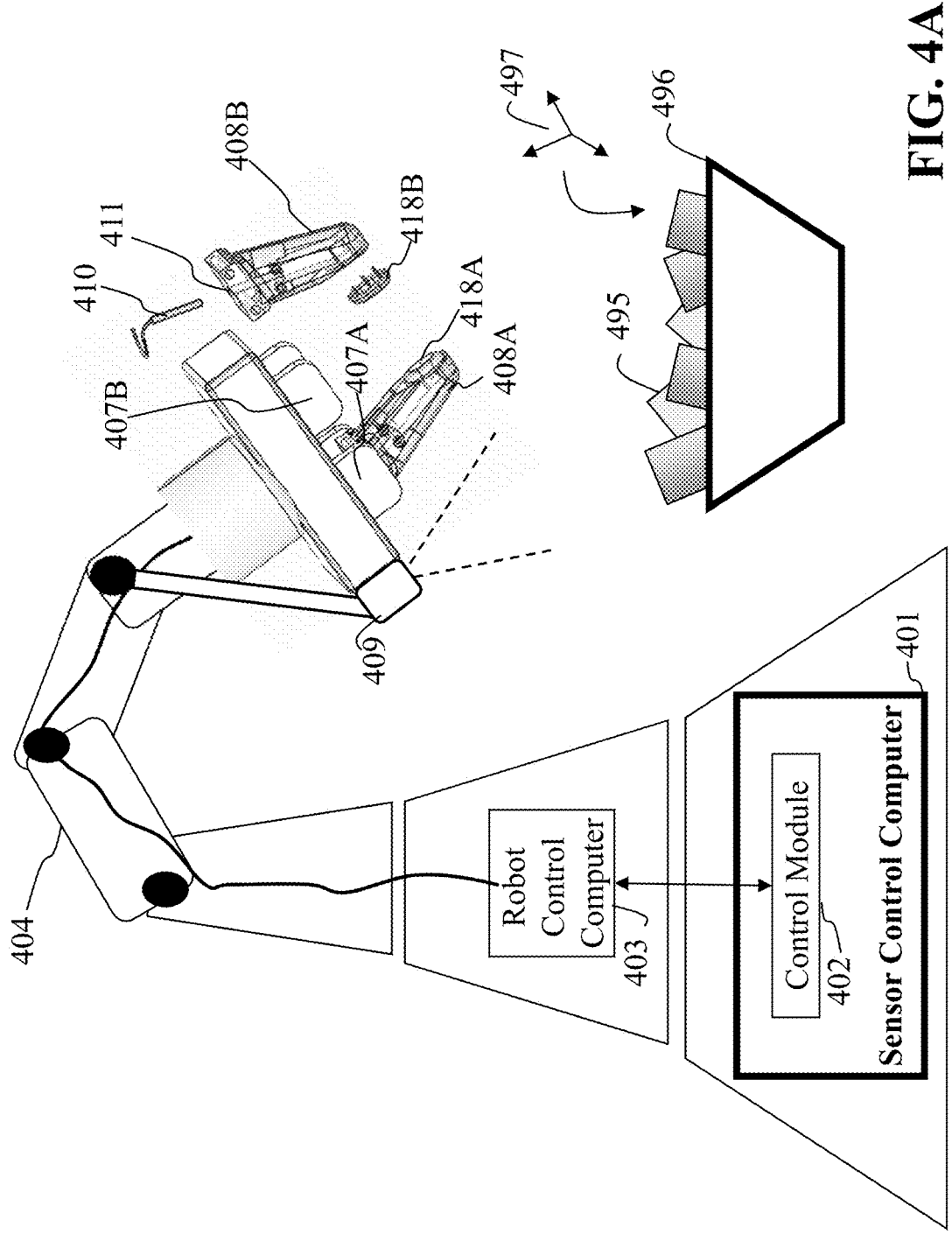
FIG. 4A is a schematic diagram illustrating an embodiment of a robot assembly including grippers and two elastomeric sensors, according to some embodiments of the present disclosure.

FIG. 4A is a schematic diagram illustrating an embodiment of a robot assembly including grippers 408A, 408B and two elastomeric sensors 418A, 418B, according to some embodiments of the present disclosure. For this particular application, at least one goal may be to pick objects 495 from a bin 496 based on the object poses 297. The system includes a 6-axis robotic arm 404 with grippers 408A, 408B. A 3D sensor 409 can be arranged on the arm 404 to acquire data of the scene including the objects 495 and bin 496. Then, the grippers 408A, 408B can pick the objects 495 from the bin 496 depending on their poses. It should be noted that the bin could contain different objects.

As noted in step 235 of FIG. 2A, a single best match may be desired as the output by the sensor processing. For example, "GRIP OK" versus "NO OBJECT FOUND" versus "GRIP TOO TIGHT" versus "GRIP ON EDGE" might be labels for some of the stored XY location sets, and so those would be output by the sensor processor.

One example 3D sensor uses structured light generated by a projector. Other sensors, such as stereo cameras and time-of-flight range sensors are also possible. The sensor acquires 3D scene data, e.g., a point cloud. The 3D sensor is calibrated with respect to the robot arm 404. Thus, the poses of the objects 495 can be estimated in a coordinate system of the 3D sensor that can be transformed to a coordinate system of the robotic arm 404, allowing grasping and picking of the objects by controlling the robotic arm 404 according to the poses via the robot control computer 403. The scene data can be processed by the control module that may implement a determined method to be performed in the sensor control computer 401. The sensor control computer 401 can include memory and input/output interfaces as known in the art.

However, the differentiating factor that is novel over conventional robot assemblies is the elastomeric sensors including the elastomeric caps 418A, 418B. For example, today's manufacturing facilities include flexible assembly lines, however, most conventional robot grippers have many problems, including little or no tactile sense, which creates a problem for these conventional robots to be used for flexible assembly lines. At least one reason is that these conventional specialized gripper fingers designed for high precision part grasping and grasp validation, cannot be used for flexible assembly lines. This is because these conventional specialized gripper fingers are not operationally capable of incorporating an amount of flexibility that allows the grippers to react in case of changes, whether predicted or unpredicted. Similarly, the conventional robots have a low level of capability to know if an actual assembly operation was successful or not, i.e. such as grippers grab is "GRIP OK" versus "NO OBJECT FOUND" versus "GRIP TOO TIGHT" versus "GRIP ON EDGE". In order to overcome these problems of conventional robots, some embodiments of the present disclosure including FIG. 4A, are configured as a mechanically robust general-purpose gripper fingertips 418A, 418B, that provide a full force set in pressure, translation, rotation, and shear, that can be used, by non-limiting example, for flexible assembly lines.

FIG. 4B is a schematic diagram illustrating an embodiment of an elastomeric cap having pins and ridges attached to locations on the outer impact surface 427 of the elastomeric cap, according to some embodiments of the present disclosure. For example, the ridges 420A, 420B, 420C can extend part of the length of the cap 428 or a full length of the cap 428. Further, the ridges 420A, 420B, 420C, can be different lengths, different ridge heights or different ridge thickness, depending upon a specific application directed to a certain level of intended measurable sensitivity as predetermined by a user. It is possible that the ridges 420A, 420B, 420C, could extend along the length along with ridges extending along the width or narrow area. As mentioned above, the ridges 420A, 420B, 420C can structured and design in combination with the pins 423A, 423B, 423C, depending upon an intended level of measurable sensitivity a specific application is designed to accomplish as predetermined by a user.

Figure 4C:
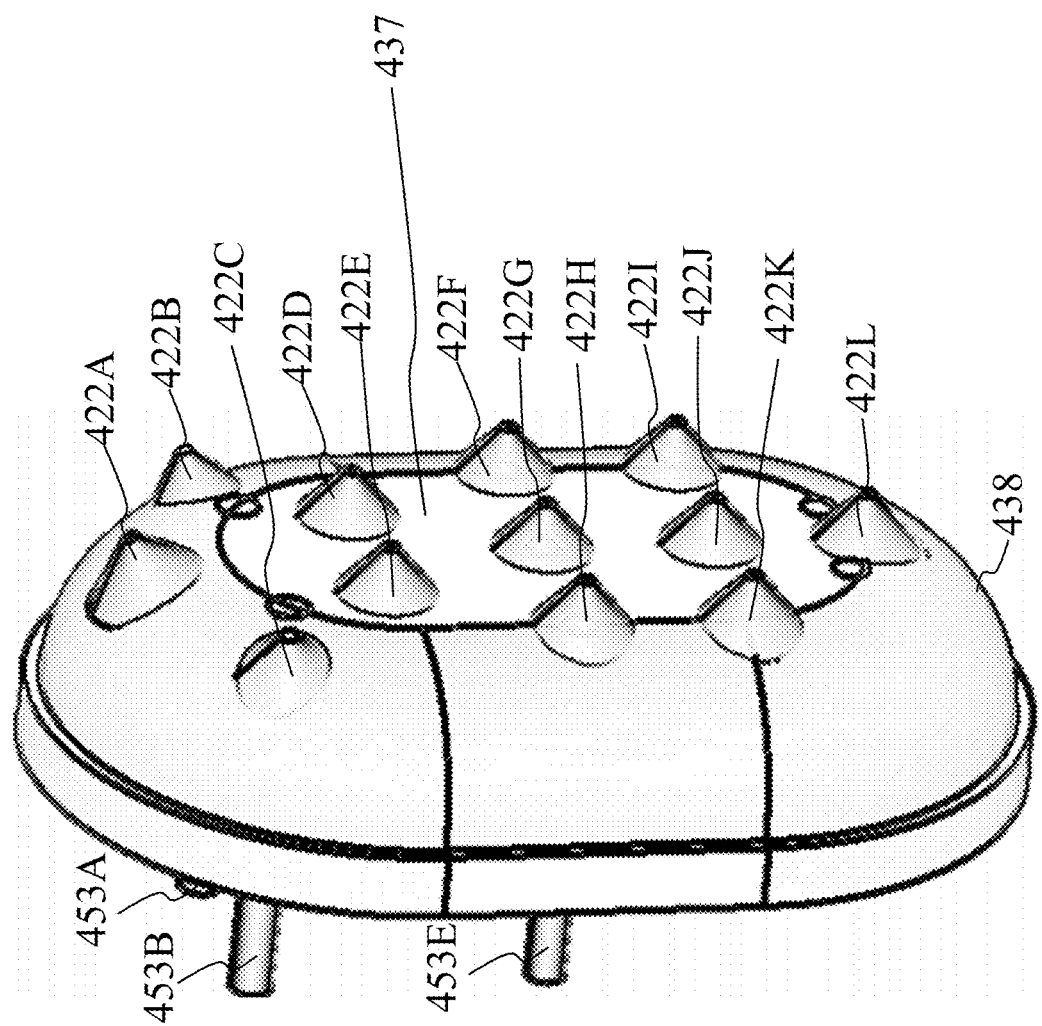
FIG. 4C is a schematic diagram illustrating an embodiment of an elastomeric cap having pins on the inner surface and cones attached to locations on the outer impact surface of the elastomeric cap, according to some embodiments of the present disclosure.

FIG. 4C is a schematic diagram illustrating an embodiment of an elastomeric cap 438 having pins 453A-453C and cones 422A-422L attached to locations on the outer impact surface 437 of the elastomeric cap 438, according to some embodiments of the present disclosure. For example, the cones 422A-422L can cover the entire cap 438 or only regions of different parts of the cap 438. Further, the cones 422A-422L, can be different base diameters, different cone heights or different cone thickness, depending upon a specific application directed to a certain level of intended measurable sensitivity as predetermined by a user. It is possible that the cones 422A-422L, could extend along an edge length, or around the circumference of the cap 438.

Figure 4D:
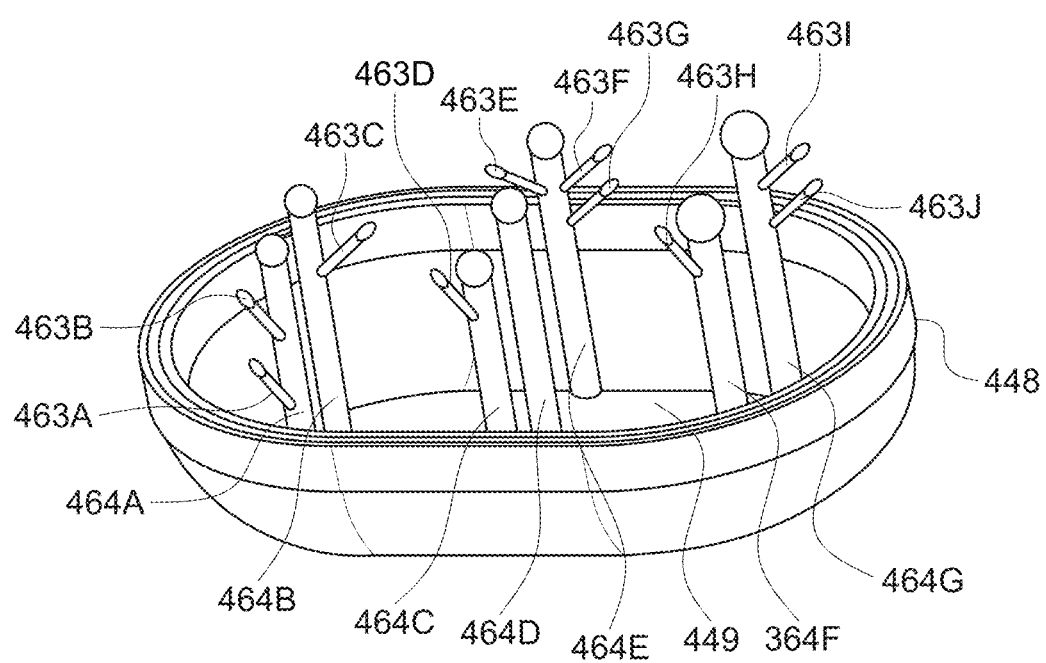
FIG. 4D is a schematic diagram illustrating an embodiment of an elastomeric cap having pins with micro-levers or micro-arms attached along and extending from the pins, such that each micro-lever or micro-arm can include a mark, according to some embodiments of the present disclosure.

FIG. 4D is a schematic diagram illustrating an embodiment of an elastomeric cap 448 having pins 464A-464G with micro-levers or micro-arms 463A-463J attached along and extending from the pins, wherein each micro-lever or micro-arm 463A-463J can include a mark attached an end furthest from the undersurface 449, according to some embodiments of the present disclosure. Some pins 464A-464G with include lever arms 463A-463J can be attached to locations on the undersurface 449 of the elastomeric cap 448, at a location on a sidewall of the undersurface 449. From experimentation, such pin locations can provide an increased level of measurable motion sensitivity of the pin 464A-464G, as well as a further increased level of measurable motion sensitivity when the pin has a lever arm(s) 463A-463J attached when compared to a pin 464A-464G attached at the location with no lever arms attached.

Referring to FIG. 1C, FIG. 4B and FIG. 4C, contemplated the outer impact surface can include attributes, the attributes including one or a combination of at least one texture such as a smooth texture, a rough texture, symmetrical protuberances, non-symmetrical protuberances, or a pattern of protuberances with or without the at least one texture. The attributes can include the ridges of FIG. 4B, cones of FIG. 4C, or other like protuberances. Realized from experimentation is that a particular combination of the attributes with a particular structural arrangement of the pins with or without lever arms, can provide an increased level of measurable motion sensitivities specific to an intended pattern of pressures, forces, or both.

Specifically the attributes can be structured and arranged to include a combination of one of cone shape protuberances, symmetrical protuberances or non-symmetrical protuberances, that provide user preferred increase of measurable sensitivities of the pattern of forces including detecting an amount of measurable in-plane forces, shear forces and torque forces, to the outer impact surfaces across the elastomeric tactile sensor, according to a user specified application directed to a set of measurable forces.

Figure 5A:
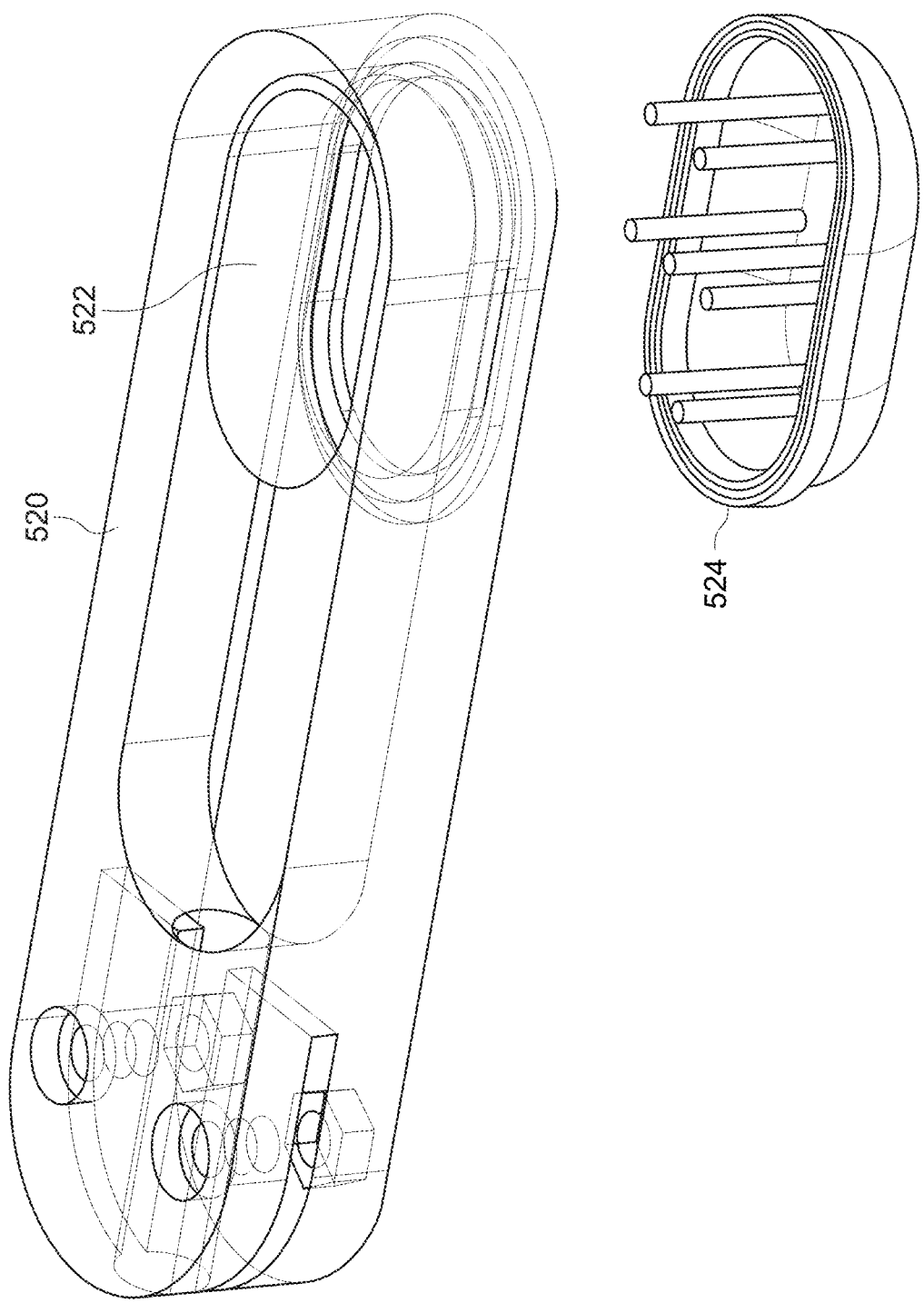
FIG. 5A is a schematic diagram illustrating an embodiment of an elastomeric cap arranged with a straight gripper cavity configuration in relation to a structure of the gripper, according to some embodiments of the present disclosure.

FIG. 5A is a schematic diagram illustrating an embodiment of an elastomeric cap arranged with a straight gripper cavity configuration in relation to a structure of the gripper, according to some embodiments of the present disclosure. For example, the gripper 520 includes a gripper cavity 522, that the elastomeric cap 524 attaches, wherein the elastomeric cap 524 is arranged along the straight gripper cavity 522.

Figure 5B:
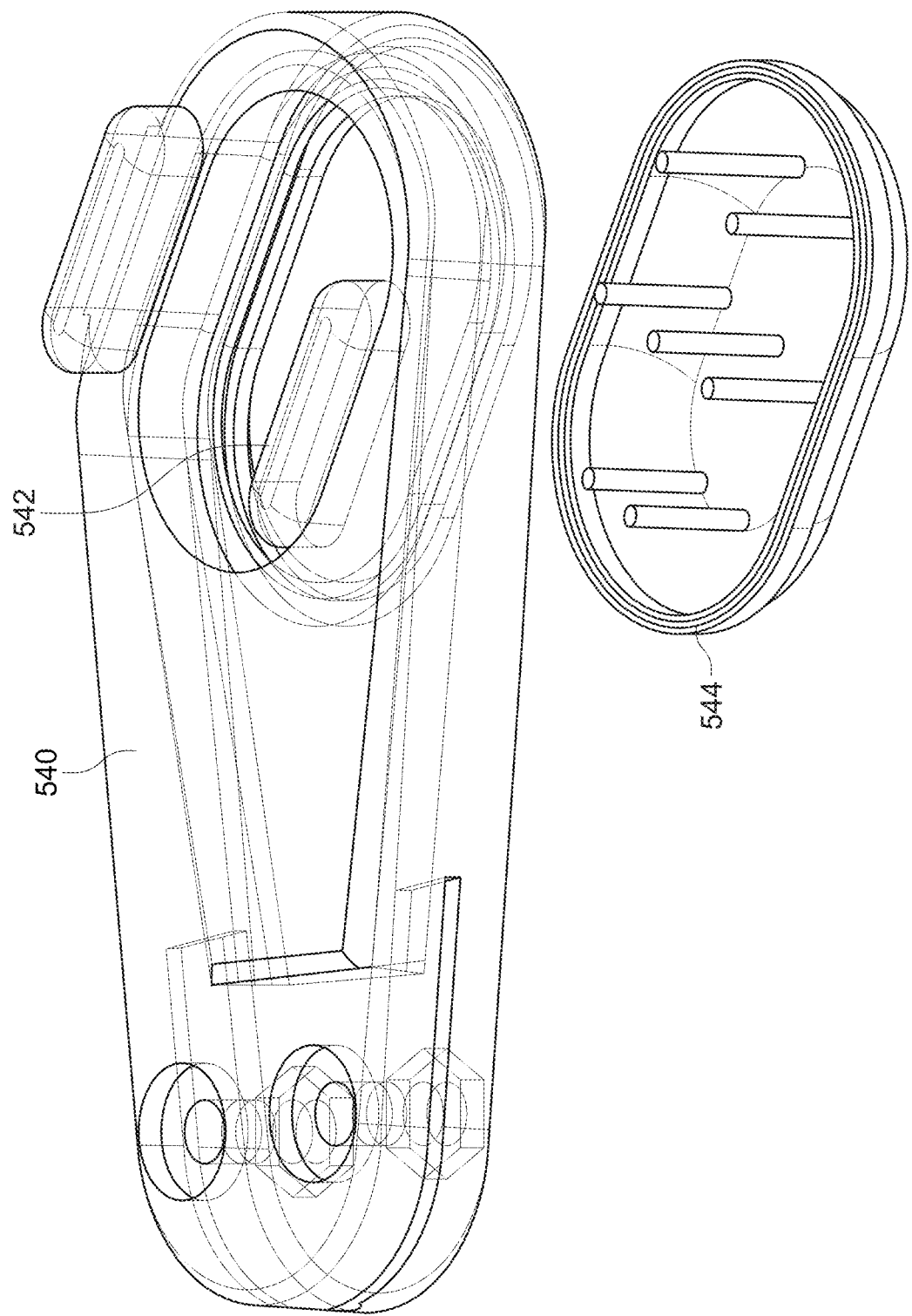
FIG. 5B is a schematic diagram illustrating an embodiment of an elastomeric cap arranged with a bent or curved gripper cavity configuration in relation to a structure of the gripper, according to some embodiments of the present disclosure.

FIG. 5B is a schematic diagram illustrating an embodiment of an elastomeric cap arranged with a bent or curved gripper cavity configuration in relation to a structure of the gripper, according to some embodiments of the present disclosure. For example, the gripper 540 includes a gripper cavity 542, that the elastomeric cap 544 attaches, wherein the elastomeric cap 544 is arranged along the bent or curved configuration of the gripper cavity 542.

Figure 5C:
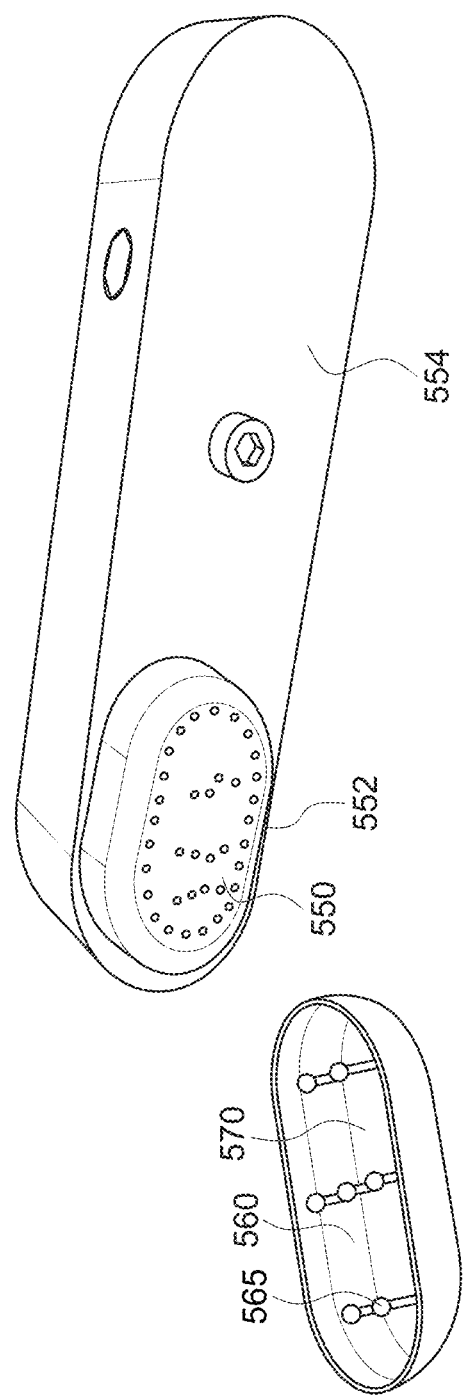
FIG. 5C is a photograph illustrating an embodiment of an elastomeric cap attached to a straight gripper cavity configuration in relation to a structure of the gripper, along with another elastomeric cap with the underside facing upward in order to show the pins, according to some embodiments of the present disclosure.

FIG. 5C is a photograph illustrating an embodiment of an elastomeric cap 550 attached to a straight gripper cavity configuration 552 in relation to a structure of the gripper 554, along with another elastomeric cap 560 with the underside 570 facing upward in order to show the marks 565, according to some embodiments of the present disclosure.

Figure 5D:
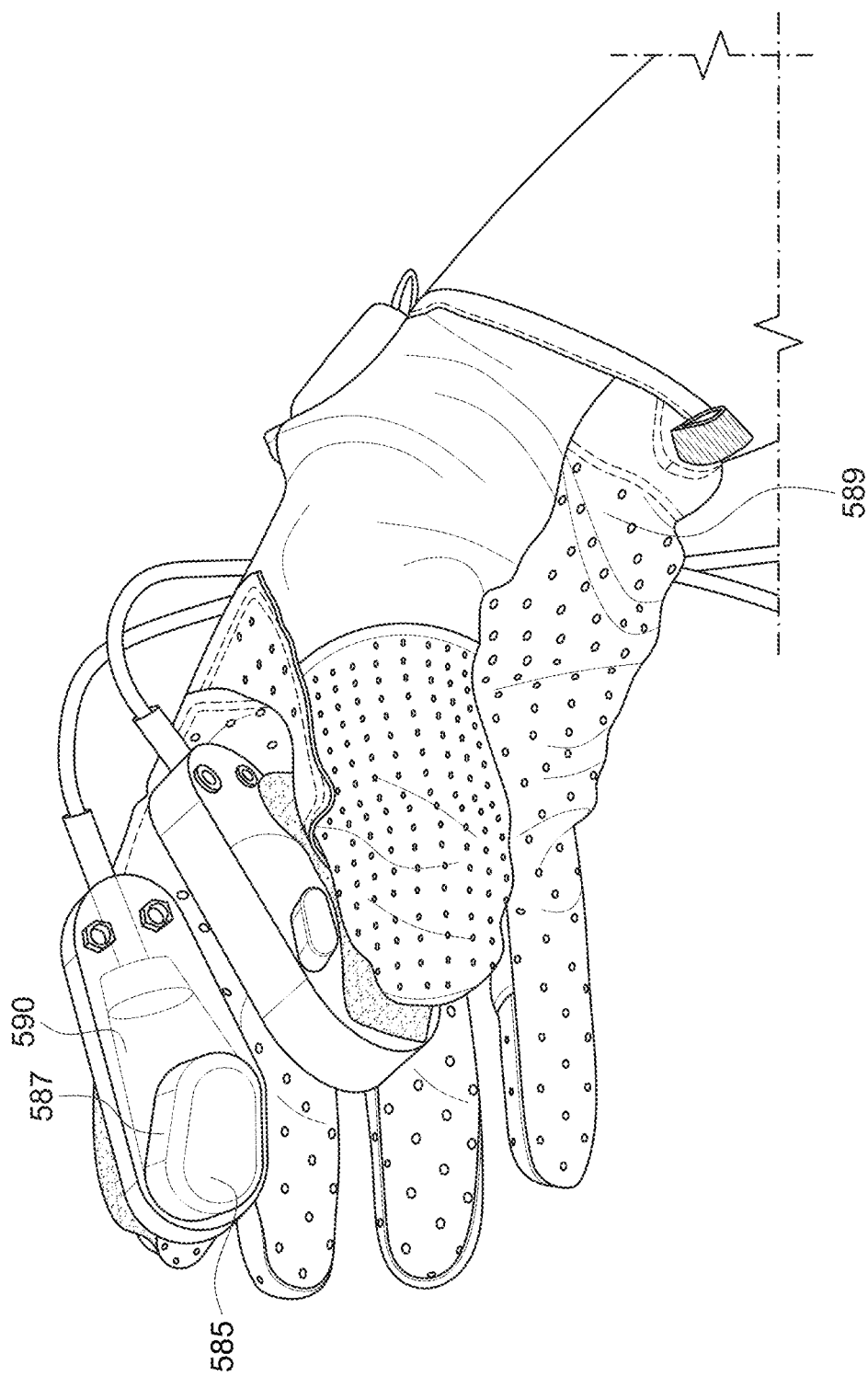
FIG. 5D is a photograph illustrating an embodiment of an elastomeric cap attached to a bent or curved gripper cavity configuration in relation to a structure of the gripper, along with a human-worn "teach glove", according to some embodiments of the present disclosure.

FIG. 5D is a photograph illustrating an embodiment of an elastomeric cap 585 attached to a bent or curved gripper cavity configuration 587 in relation to a structure of the gripper 590, along with a human-worn "teach glove" 589, according to some embodiments of the present disclosure. Some benefits/advantages of the elastomeric sensor or elastomeric cap 585 being used in a human-worn "teach glove" 589, is that the movements of the fingers of the human wearing the glove 589 can be recorded along with a proper force tensor to be applied during a later robotic assembly operation. Noted, is that other camera angles could be utilized including 0-10 degrees, 10-15 degrees, 10-20 degrees and 15-30 degrees, for the camera (not shown) in the gripper 590.

FIG. 6A and FIG. 6B, FIG. 6A is a photograph illustrating an embodiment of an elastomeric cap 610 with an illuminated view of a pins 612 with no pressures or forces applied to the outer impact surface (not shown) of the elastomeric cap 610, and FIG. 6B is the same view the pins 612 with less illumination, according to some embodiments of the present disclosure.

FIG. 6C and FIG. 6D, FIG. 6C is a photograph illustrating an embodiment of an elastomeric cap 620 with an illuminated view of a pins 622 with forces applied to the outer impact surface (not shown) of the elastomeric cap 620, and FIG. 6D is the same view the pins 622 with less illumination, according to some embodiments of the present disclosure.

FIG. 6E and FIG. 6F, FIG. 6E is a photograph illustrating an embodiment of an elastomeric cap 630 with an illuminated view of a pins 632 with torque forces applied to the outer impact surface (not shown) of the elastomeric cap 630, and FIG. 6F is the same view the pins 632 with less illumination, according to some embodiments of the present disclosure.

FIG. 6G and FIG. 6H, FIG. 6G is a photograph illustrating an embodiment of an elastomeric cap 640 with an illuminated view of a pins 642 with near pressures applied to the outer impact surface (not shown) of the elastomeric cap 640, and FIG. 6H is the same view the pins 642 with less illumination, according to some embodiments of the present disclosure.

FIG. 6I and FIG. 6J, FIG. 6I is a photograph illustrating an embodiment of an elastomeric cap 650 with an illuminated view of a pins 652 with lateral shear forces applied to the outer impact surface (not shown) of the elastomeric cap 660, and FIG. 6J is the same view the pins 652 with less illumination, according to some embodiments of the present disclosure.

Figures 6K, 6L:
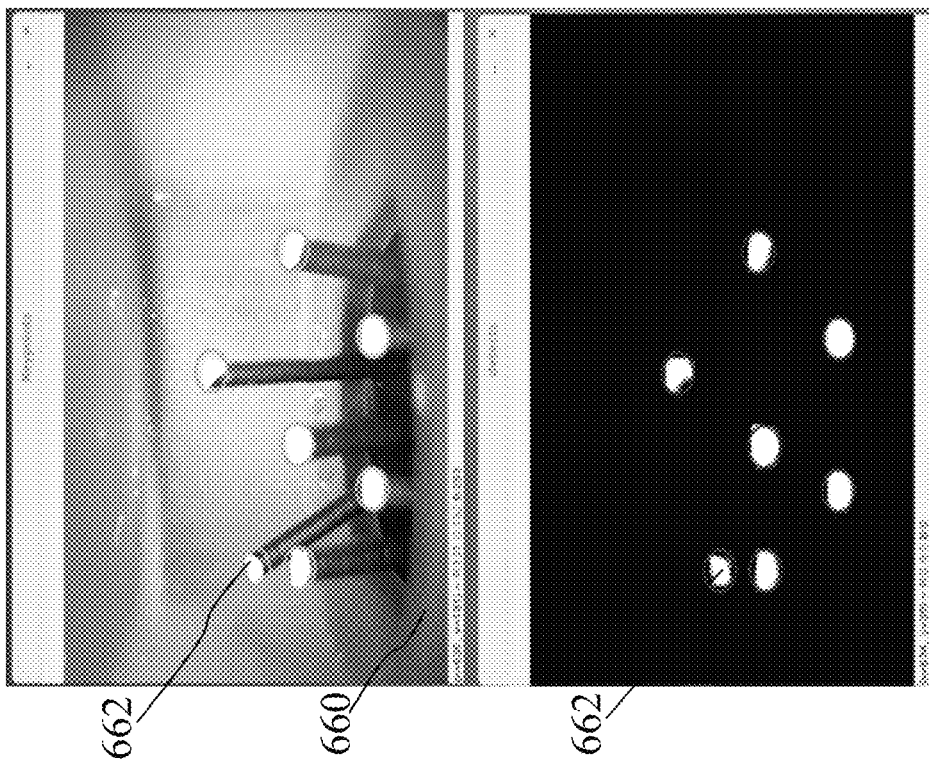
FIG. 6K and FIG. 6L, FIG. 6K is a photograph illustrating an embodiment of an elastomeric cap with an illuminated view of a pins with off center far axial shear forces applied to the outer impact surface (not shown) of the elastomeric cap.

FIG. 6K and FIG. 6L, FIG. 6K is a photograph illustrating an embodiment of an elastomeric cap 660 with an illuminated view of a pins 662 with off center far axial shear forces applied to the outer impact surface (not shown) of the elastomeric cap 660, and FIG. 6L is the same view the pins 662 with less illumination, according to some embodiments of the present disclosure.

Experimentation

At least one realization gained from experimentation is to include a micromechanical lever attached at a juncture zone between the flat section of the underside of cap and the radius section. When the cap is pressed down 0.1 mm, the radius section will be forced to change curvature and curve more tightly. More precisely, the radius section will distort from a 10 mm radius to a 9.9 mm radius. Assuming the cap material acts relatively incompressible and bends rather than bulges, that translates to a change in arc length of the cap from exactly 90 degrees and 15.7079 mm long undistorted, to a constant length of 15.7079 mm over a 9.9 mm radius, so 15.7079=9.9 mm*new angle, and new angle is 1.5866 radians or 90.905 degrees, which is a distortion of 0.905 degrees in the radius.

Because the flat top of the cap is supported by the pressing object, the flat top will remain mostly flat and most of the accommodation will be in the sidewall. Thus, the micromechanical pin will move up 0.1 mm (with the cap) but also bend outward about 0.9 degrees.

Assuming our micromechanical pin is 20 mm long, consistent what we experiment with, sin (0.9 deg)*20 mm=0.31 mm lateral displacement due to tilt in the micromechanical pin. The pin also moves vertically, for a total motion of just under 0.4 mm. This shows a gain of about 4×.

Of course, this is an oversimplification due to the two-dimensional nature of the example. Two effects need to be addressed: first, the rim of the elastomer cap at the base of the radius is fixed in both position and angle with respect to the camera, and second, the base rim of the cap has much larger stress-bearing cross section compared to the juncture of the cap top flat, to a first approximation, there is about twice the cross section at the fixed root of the elastomer cap as at the flat top, doubling the strain (and distortion, and tilt) experienced by the microlever. Secondarily, the rim of the cap being fixed pushes the distortion into the central area of the cap, again doubling the strain, distortion, and tilt experienced at the base of the microlever.

In sum, there is a tip motion of the microlever tip that experiences about 1.6 mm movement, which is predicted from a rough calculation and finite element modeling, and later confirmed by actual experiments using 3-D printed elastomer caps.

The observed 1.6 mm of fiducial mark motion is larger than the diameter of the pin itself and is far larger motion than a direct observation of the surface moving at 0.1 mm. This is the justification and purpose of the freely moving microlevers in the present disclosure; this is a very large gain of 16x in an observed position due to strain distortion in the elastomer cap. This observed position is remarkable and can be measured using a simple video camera, such as web camera.

Because of this microlever distortion gain, the images captured by the video camera have large motions in the fiducial marks and have much better signal to noise ratio compared to the conventional tactile sensor methods, which directly imaged the top surface of the contacting surface, either by grazing illumination or through a proxy of a hemispherical gel.

The use of independently moving microlevers also allows different parts of the cap to experience and report drastically different local strains and forces. For example, part of the cap may be in left-to-right shear, an other side of the cap may be in right-to-left shear, and because the microlevers move freely rather than being captive in a continuous gel, the custom configuration of the sensor can correctly detect this situation as a surface torque rather than being insensitive to that particular set of forces, like that as a hemispherical gel would be insensitive to these particular set of forces.

Several experiments were undertaken in order to take advantage of these microlever-amplified fiducial mark motions to generate a force signal output. Some aspects considered including structurally arranging a fixed camera at different positions within a cavity of the gripper.

Based on experimentation, when having one or more video camera positioned with a viewing angle between zero and twenty degrees (zero to ~20), i.e. oblique angle, this one or more video camera arrangement resulted in a low profile highly sensitive elastomeric tactile sensor. Some benefits and advantages of the low profile elastomeric sensor of the present disclosure, by non-limiting example, provides for a solution to some of today's technological problems of conventional tactile sensors that have large profile(s). For example, the low profile elastomeric sensor of the present disclose is suitable not only for robot gripper industry, but also for applications, by non-limiting example, related to installation on a "teach glove" for humans to wear, that can capture typical forces a robot should expect when performing an assembly operation.

Many tests were conducted to determine how to design and structure the elastomeric cap based a level of sensitivity, durability, and the ability to be fabricated by both conventional injection molding and by 3D printing such as polymer-SLA. Experimental tests were conducted with arm motor torque sensors, post-grip validation sensors, wrist force sensors, gripper motor position and torque sensors. From the post-grip validation experiments, what was learned is that after the robot executes the part grasp operation, the robot usually moves the part to a machine vision station. The machine vision station has a machine vision system that validates that the gripper is holding a desired part in a desired orientation, wherein if any corrections are needed, the correction is implemented. Then, the part is assembled, or moved to a "retry" bin for human reorientation and validation. This motion occurs after the part is removed from the feed jig and before it is moved to the assembly area; it can detect miss-grips only at this one point in time What was learned from experimenting with the gripper finger strain gauge sensors is that these sensors integrate a strain gauge into the gripper finger so only the fingertip forces are registered, which appeared to be equivalent to sensing only "Z" pressure. However, these sensors failed to provide for sensing other forces such as a centered pressure, an offset pressure, a lateral force X, a shear force Y, torques in a pitch, a yaw, or a roll, a pinch lateral force X, or a pinch shear force Y.

Another sensor that was reviewed via public documents was a GelSight sensor. This sensor used a thick block of clear gel with a flexible opaque coating on one side. The coated side of the block was pressed against a surface and the distorted paint was observed perpendicularly, while illuminated under several different angles of grazing illumination. What was learned is that this sensor was highly capable for finding upward jutting textures (burrs) on a surface. However, this sensor appeared not to be useful for voids or pinholes as the opaque coating bridged over voids and pinholes, and that the sensor had a very low level of damage force threshold and damage from surface friction was common. Another disadvantage, among many discovered, is that this sensor required about 100 mm Z-axis clearance for the camera to operate. Which, due to such a large clearance for the camera meant that this sensor certainly was not capable of having a low profile configuration, and appeared to be better suited for robotic inspection of textured surfaces, rather than for any type of low profile applications. In addition, the low level of force damage threshold and surface wear made this sensor not suitable for robotic assembly.

Some aspects learned from the different types of sensor experimentation, is that robots are used for assembly, but proper assembly is dependent on the robot always gripping a part in exactly the same position and orientation. Miss-grips lead to failed assembly, damaged parts, as well as damaging the gripper or robot itself. Even if the part is gripped correctly, if the receiving parts are not correct, or the receiving parts are contaminated or distorted, the robot will attempt to force the assembly, yielding a bad assembly, damaged parts, or a damaged robot or robot gripper. In view of the above experimental findings the experimented sensors could not be modified or further developed in order to meet the present disclosure desired level of sensitivities, durability, costs of manufacture, among many other factors, and were not further analyzed.

Based on the extensive experimentation, and desired level of sensitivities, durability, costs of manufacture, and other factors, many realizations were obtained for designing and constructing some embodiments of the present disclosure. Some of these realizations for some embodiments included having the pins extend on an underside of the cap in a manner that the pins extend away from the underside. This configuration included having to design a pin that met a level of strength, but also met a level of deformability in order to be capable of deforming to record amounts of deformation of the pin due to external force tensor. In particular, some configurations of the pins were specifically designed to maintain relative angles and positions generally constant between the pins. For example, discovered from public documents on experimentation via an optical flow analysis, pins were arranged parallel in an experimental cap, and the cap filled with a highly flexible transparent silicone. The assembly exhibited an adequate certain level of strength, i.e. a level of strength that impinged on the deformity of the pins when an applied external force was exerted. This experimental cap resulted in an acceptable measurable level of a perpendicular force. However, this same experimental cap configuration failed in providing an acceptable level of measurable shear and torque sensing/force, based on image motion obtained with a perpendicular (z-axis) camera of the pin tips. What was learned from this experimental configuration is that a level of pin strength must not be too high a level of strength, to restrict a level of pin mobility, to achieve a measurable force tensor, at least in view of the desired level of measurable sensitivity goals of the present disclosure. Also learned from this experimentation, is that keeping pins substantially parallel in combination with a too high a level of strength of the pin, resulted in preventing pin tip and tilt, which resulted in an experimental pin configuration insensitive to shear (X and Y pressure), insensitive to torques in X, Y & Z as well as insensitive to pinch forces in X and Y.

The number of pins to be mounted/attached/molded to the underside of the elastomeric cap, can depend on many factors (as learned from experimentation), for example, is that what was realized is that the number of pins can be dependent on a specific application based upon a user intention and goal(s), in terms of achieving a predetermined level of sensitively, durability, etc.

For example, the applied external forces, i.e. full force tensor, applied at an outer impact surface of the elastomeric cap (perpendicular "Z" pressures, both centered and offset, lateral "X" and "Y" shears, and torques in pitch, yaw, and roll)) can all be sensed by the elastomeric tactile sensor. The simple, compact tactile sensor designs of the present disclosure can be used with robotic, prosthetic applications, computer applications, Human-Safe Cooperative Robot Safety Sensors and automotive related applications. Further, the high-resolution tactile sensors of some of the embodiments of the present disclosure are also useful for accurate control devices such as high-density miniature computer products, for highly sensitive robotic cap sensing; touch-sensitive virtual reality devices such as control gloves worn by a remote operator; and fingers of a robot used for surgical operation of patients.

In order to process the data generated from the images of the camera of the pins movement, a Finite Element Modeling (FEM) can be used to process the data of the cap as a metamaterial design. A metamaterial is an object where the internal structure produces a final object whose physical properties (electrical, magnetic, mechanical, thermal) properties are markedly different than the bulk properties of it's constituent "real" materials, i.e. negative $\varepsilon$, $\mu$, nearly arbitrary speed of light c, Poisson's ratio v or thermal conductivity $\kappa$. Basically, the FEM model can predict elastomer deformation under different loadings. In addition, the elastomer pins elevate the surface profile and convert surface inclination into an easy-to-image XY motion, i.e. using low cost webcam images of the pin tips. Further, the structural design of the cap with fewer fiducial marks provides for simple image thresholding, no interframe tracking/ambiguity. In fact, it is possible to use OpenCV to track the pin tip's motion that is converted to a force map. This minimizes computational expense and maintains a high frame rate.

During experimentation, an inverse FEM proved to be computationally expensive. What was realized is that training of the model should be with real data. An aspect further learned from experimentation is that using Euclidean distance in a 14-dimensional space to a label situation with grasp position, angular pose, shear and torque, proved beneficial. For example, the computational time was very fast, i.e. an amount of computational cost proved very low, resulting in an ability of processing in real-time with an excellent visualization on one 1 GHz cpu (e.g. Raspberry Pi Zero).

Some technologies the embodiments of the present disclosure can be utilized includes FEM, 3D printing of micromechanical elastomer assemblies, small (5.5 mm diameter) webcams. Wherein the webcams can be bought inexpensively, i.e. $20 or less. The embodiments can also be used for robot gripping that will provide validation of grasp pose, angle, center of gravity and force tensor at 30 Hz. Also, robot teaching, such that a control program can record what the grasp should feel like, how hard to grip, and what a slip feels like.

Some other benefits using the FEM and 3D printing can allow the design and production of an elastomeric cap have many attributes. For example, some attributes can include providing an elastomeric cap with a desired amount of sensitivity or damage threshold, or to a particular amount of force directions. Wherein, asymmetry in the cap, pin heights, pin locations, and mounting configurations allows for differentiation between different force directions. In addition, the low profile of the cap can allow the tactile sensor to be used both on a robotic gripper and on a "teaching glove" worn by a human teaching the robot, and thereby, capturing the correct force tensor for the task being performed. In many cases, computing the actual force tensor may unnecessary, such that a simple comparison of the pin tip positions against a preset library of correct and incorrect images is sufficient to determine a proper or improper robotic grasp, or interpolated against a library of known distortions to yield good estimates of the actual force tensor on the sensor in real time.

Other embodiments of the present disclosure also address todays industrial needs by providing benefits such as simple compact tactile sensors at a low-cost, low-mass, along with a shallow-profile, while delivering highly sensitive sensing of applied external forces on the elastomeric tactile sensor. Some of these benefits allow for the compact tactile sensor of the present disclosure to be used in technologies where prior conventional use proved too costly for different technological industries. For example, simply placing delicate foodstuffs like fruit, sushi, or baked goods requires a level of touch control that makes a human employee the less expensive alternative to a robot.

Features

According to another embodiment of the present disclosure, a tactile sensor for a robot, including an elastically deformable element including an outer impact surface and an undersurface having pins, ridges, or both. Each undersurface pin or ridge includes a mark, and the elastically deformable element is attached to a gripper of the robot. A camera positioned in a cavity of the gripper to capture images of the marks. A memory having stored data including image data of sets of prelearned positions of marks with corresponding prelearned patterns of forces, each set of prelearned positions of marks corresponds to a prelearned pattern of forces. An image processor operatively connected to the camera and the memory. The image processor is configured to detect positions of the marks in captured images. Compare the detected positions of the marks in the captured images to the sets of the prelearned positions of marks, based on a distance function, to determine a quality of match value for each set of the prelearned positions of marks. Determine a best quality matched prelearned pattern of forces using a user selected best matching function, that is applied to the determined quality of match values, to calculate a best matching set of the prelearned positions of marks and the corresponding best quality matched prelearned pattern of forces. Identify a pattern of forces acting on the elastically deformable element based on the determined best-matched prelearned pattern of forces. Output the identified pattern of forces to initiate a gripper action for the gripper based on the identified pattern of forces acting on the deformable element. Wherein the following aspects below are contemplated as configuring a modified embodiment of the above embodiment.

According to aspects of the present disclosure, the image processor converts the detected position of each mark in the captured images by identifying measured image coordinates of locations in images of the captured images using an image measuring function, to obtain the detected positions of the marks, the captured images includes a starting position image and a final position image for each mark. Wherein the detected position of each mark are summed as Euclidean distances, thereby forming a match distance between the starting position image and the final position image of the mark.

At least one benefit of the aspect can be the determining of the pattern of forces acting on the elastically deformable element includes using a machine vision algorithm. Also an aspect that the pattern of forces acting on the elastically deformable element includes one or a combination of, a perpendicular pressure Z, a centered pressure, an offset pressure, a lateral shear force X, a lateral shear force Y, centered or offset torques in a pitch, a yaw, or a roll, a centered or offset pinch force X, or a centered or offset pinch force Y. a centered or offset spreading lateral force X, or a centered or offset spreading lateral force Y. Another aspect can be the robot is a dynamic robot and the gripper is controlled in response to the identified pattern of forces acting on the outer impact surface determined in the image processor.

Another aspect is when forces are applied to the outer impact surface, the outer impact surface elastically deforms, causing the undersurface pins, ridges or both, to undergo a flexing motion, which detects the marks. Further still, an aspect can be that the best matched set of the prelearned positions of marks is determined using the user selected matching function that includes: (1) a best quality of match via the distance function; (2) a predetermined weighted average among a user selected number of best quality of match values via the distance function; or (3) a predetermined weighted sum of all quality of matched values. Another aspect is that each pattern of forces includes a set of forces perpendicular to the outer impact surface, torque forces and shear forces.

An aspect can include the outer impact surface changes between a undeformed state when no forces are applied to the outer impact surface, and an elastically deformed state when forces are applied to the outer impact surface which elastically deforms the outer impact surface, causing the undersurface pins, ridges or both, to undergo a flexing motion, which detects the marks, and wherein the image processor compares the positions of the marks in the captured images by evaluating a relative position of the undersurface pins, ridges or both, between the undeformed state and the elastically deformed state.

Still another aspect can be the outer impact surface includes attributes, the attributes including one or a combination of at least one texture such as a smooth texture or a rough texture, symmetrical protuberances, non-symmetrical protuberances, or a pattern of protuberances with or without the at least one texture, and are structured and arranged in combination with the undersurface pins, ridges, or both, to provide user preferred measurable sensitivities of the pattern of forces, according to a user specified application directed to a set of measurable forces. It is possible that the aspect is the user selected best matching function is applied to the determined quality of match values, and calculates a best matching set of the prelearned positions of marks and the corresponding best quality matched prelearned pattern of forces. Also, another aspect is that the outer impact surface includes attributes, such that the attributes are structured and arranged to include at least one region of a rough texture that provides for a user preferred increase and uniform measurable sensitivities of a pattern of forces including detecting an amount of measurable perpendicular forces to the outer impact surfaces across the elastically deformable element, according to a user specified application directed to a set of measurable forces. It is possible an aspect is that the attributes are structured and arranged to include a combination of one of cone shape protuberances, symmetrical protuberances or non-symmetrical protuberances, that provide user preferred increase of measurable sensitivities of the pattern of forces including detecting an amount of measurable in-plane forces, shear forces and torque forces, to the outer impact surfaces across the elastomeric tactile sensor, according to a user specified application directed to a set of measurable forces. Further still an aspect is the attributes are structured and arranged to include at least one region of ridge-like protuberances positioned perpendicular to an axis of user preferred measureable sensitivities to measurable forces or torques of the pattern of forces, according to a user specified application directed to a set of measurable forces. Also, an aspect is that the attributes include a user predetermined pattern of one or a combination of a rough texture, cone shape protuberances, symmetrical protuberances, non-symmetrical protuberances, ridges like protuberances positioned perpendicular to an axis of a preferred measureable sensitivity, that provides user preferred measurable sensitivities of a pattern of forces, according to a user specified application directed to a set of measurable forces.

These aspects below can be incorporated into any of the above device, methods and systems. For example, an aspect can be that the image processor converts relative positions of each fiducial tip marker in the captured images by identifying measured image coordinates of locations in images of the captured images using an image measuring function, to obtain set of relative positions of the fiducial tip markers, such that each fiducial mark as measured in the image coordinates between the captured image and the other captured image, have the relative positions summed as Euclidean distances, thereby forming a match distance between the captured image and the other captured image.

Another aspect can be that the detecting of the positions of the marks in the captured images is by an image measuring function. The image processor implements steps of the image measuring function including retrieving the sets of prelearned positions of marks with prelearned patterns of forces from the memory. Identifying a corresponding set of prelearned positions of marks from the image data to detected positions of the marks in the captured images. Identifying measured image coordinates of locations in images of the captured images using an image measuring function, to obtain the detected positions of the marks, the captured images includes a starting position image and a final position image for each mark, the detected position of each mark are summed as Euclidean distances, thereby forming a match distance between the starting position image and the final position image of the mark.

Still another aspect is that the camera includes one or more camera that view the fiducial marks at an oblique angle, the oblique angle includes a range of one of, a zero degree angle up to a 10-degree angle, a zero degree angle up to a 20-degree angle or a 21 degree angle up to a 30-degree angle.

It is possible an aspect is that each pin includes lever arms attached to locations on the undersurface of the elastomeric cap, including at least one location on a sidewall of the undersurface, such that the pin is a mechanical motion amplification pin, wherein a level of motion sensitivity of the pin is increased with the lever arms attached to the locations on the undersurface when compared to a pin attached at a single location with no lever arms attached to locations on the undersurface of the elastomeric cap.

Still another aspect could be a measure of sensitivity of the elastic deformation of the top surface of the elastomeric cap is magnified using the multiple pins, in that, an amount of measurable sensitivity of the motion of deflection of the multiple pins is greater when compared to an amount of measurable sensitivity of a motion of deflection of the top surface of the elastomeric cap.

Also, an aspect can include that each fiducial mark is coded by one of a color, a barcode, a QR-like dotcode, or an other type of coding, so that a match between a fiducial mark in a location in the captured image and a fiducial mark in a nearest location of a previously learned captured image of the subset of previously learned captured images, when compared to the fiducial mark location of the fiducial mark of the captured image, is determinable.

An aspect can include the image measuring function determines the relative position of each fiducial mark of the fiducial marks placed in motion, by identifying the final location of the fiducial mark from a captured image of the captured images. Associate the identified final location of the fiducial mark to measured image coordinates in the captured image. Compare the final location measured coordinates to a set of previously learned captured images of the fiducial marks of the elastomeric cap from the stored data, to identify a subset of previously learned captured images containing a corresponding previously learned fiducial mark that includes the fiducial mark having the identified final measured image coordinates from the capture image. Compare the corresponding previously stored fiducial mark to the subset of previously stored captured images, to identify a previously learned captured image having a previously stored starting location. Associate the identified previously stored starting location with measured image coordinates, to obtain the previously stored starting location measured image coordinates. Compare the measured image coordinates of the fiducial mark from the previously stored starting location measured coordinates to the final location measured coordinates, to identify the set of relative positions of the fiducial marks placed in motion.

Still another aspect is that the relative positions of the fiducial marks are summed as Euclidean distances, thereby forming a match distance between the captured image and the subset of previously learned captured images. Such that the image processor then categorizes the captured image as labeled as acceptable or an unacceptable, based on a previously learned acceptable label or a previously learned unacceptable label of the previously learned image with the nearest Euclidean match distance.

Definitions

According to aspects of the present disclosure, and based on experimentation, the following definitions have been established, and certainly are not a complete definition of each phrase or term. Wherein the provided definitions are merely provided as an example, based upon learnings from experimentation, wherein other interpretations, definitions, and other aspects may pertain. However, for at least a mere basic preview of the phrase or term presented, such definitions have been provided.

Tensor: In mathematics, a tensor is an algebraic object related to a vector space and its dual space that can be defined in several different ways, often a scalar, tangent vector at a point, a cotangent vector (dual vector) at a point or a multi-linear map from vector spaces to a resulting vector space. Euclidean vectors and scalars (which are often used in physics and engineering applications where general relativity is irrelevant) are the simplest tensors. While tensors are defined independent of any basis, the literature on physics often refers to them by their components in a basis related to a particular coordinate system.

Finite Element Modeling (FEM): According to some embodiments of the present disclosure the FEM can be the subdivision of a whole domain into simpler parts has several advantages: (A) Accurate representation of complex geometry; (B) Inclusion of dissimilar material properties; (C) Easy representation of the total solution; and (D) Capture of local effects.

A work out of the method can involve (1) dividing the domain of the problem into a collection of subdomains, with each subdomain represented by a set of element equations to the original problem, followed by (2) systematically recombining all sets of element equations into a global system of equations for the final calculation. The global system of equations has known solution techniques, and can be calculated from the initial values of the original problem to obtain a numerical answer.

Still referring to the FEM, in the first step above, the element equations are simple equations that locally approximate the original complex equations to be studied, where the original equations are often partial differential equations (PDE). To explain the approximation in this process, FEM is commonly introduced as a special case of Galerkin method. The process, in mathematical language, is to construct an integral of the inner product of the residual and the weight functions and set the integral to zero. In simple terms, a procedure minimizes the error of approximation by fitting trial functions into the PDE. The residual is the error caused by the trial functions, and the weight functions are polynomial approximation functions that project the residual. The process eliminates all the spatial derivatives from the PDE, thus approximating the PDE locally with a set of algebraic equations for steady state problems, and a set of ordinary differential equations for transient problems.

These equation sets are the element equations. They are linear if the underlying PDE is linear, and vice versa. Algebraic equation sets that arise in the steady state problems are solved using numerical linear algebra methods, while ordinary differential equation sets that arise in the transient problems are solved by numerical integration using standard techniques such as Euler's method or the Runge-Kutta method.

Still referring to the FEM, in step (2) above, a global system of equations is generated from the element equations through a transformation of coordinates from the subdomains' local nodes to the domain's global nodes. This spatial transformation includes appropriate orientation adjustments as applied in relation to the reference coordinate system. The process is often carried out by FEM software using coordinate data generated from the subdomains.

Figure 7A:
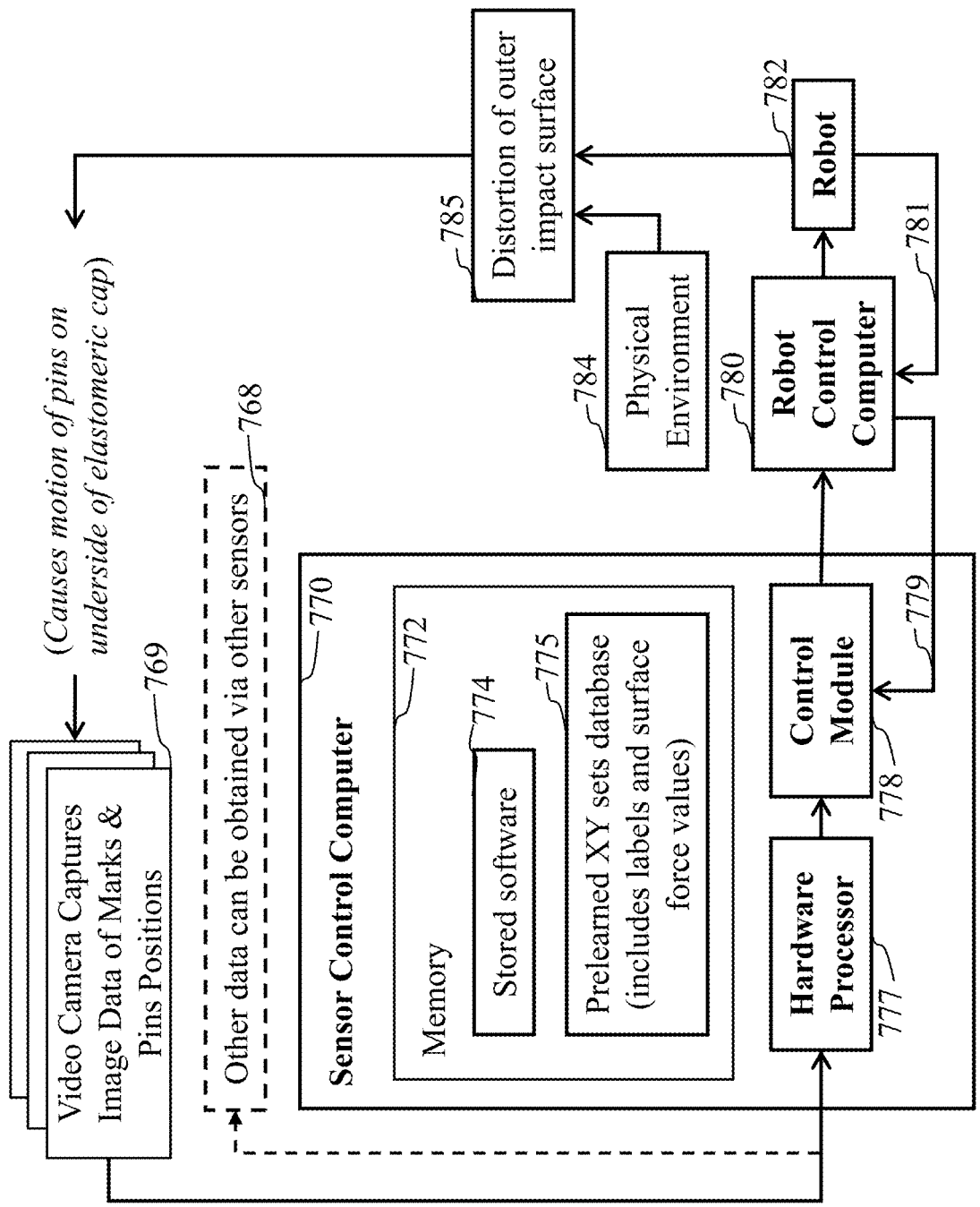
FIG. 7A is a schematic diagram illustrating some components of an alternate robotic system that includes a robot with a gripper with the elastically deformable cap and various subsystems, according to some embodiments of the present disclosure.

FIG. 7A is a schematic diagram illustrating some components of an alternate robotic system that includes a robot with a gripper with the elastically deformable cap and various subsystems, according to some embodiments of the present disclosure. For example, FIG. 7A can include a sensor control computer 770 connected to a robot 782, according to some embodiments of the present disclosure. The sensor control computer 770 can include a hardware processor 777 connected a memory 772 that includes stored software 774 and prelearned XY sets database that includes labels and surface force values. The hardware processor 777 can implement or execute stored instructions that are stored in memory 772. The processor 777 is connected the control module 778 which is connected to the robot control computer 780. The robot control computer 780 can communicate back with the control module via 779. The robot control computer 780 is connected to the robot 782, wherein the robot 782 is connected back to the robot control computer 780.

Still referring to FIG. 7A, the robot 782 is connected to the distortion of outer impact surface 785, wherein the physical environment 784 is connected to the distortion of outer impact surface 785. For example, the physical environment 784 can include an object(s) or something that may cause an impact to the outer impact surface. Further, the distortion of the outer impact surface 785 can be exterior pressures or forces making up a pattern of forces or a net force tensor that causes motion of the pins. Wherein at least one video camera 769 captures images of the marks and pins positions to obtain video image data. For example, the distortion of the outer impact surface 785 can be from exterior pressures, forces and the like, being applied to the outer impact surface 16 of FIG. 1A. The external or exterior pressures, forces and the like, can be a pattern of forces that embodiments of the present disclosure can determine an amount of measurable sensitivity for each pressure or force of the pattern of forces being externally applied to the outer impact surface 16 of FIG. 1A.

Still referring to FIG. 7AB, optionally, other data can be obtained from other sensors to the hardware processor 777. For example, the other data can include environmental data, historical data, or data related to implementing robot actions.

Figure 7B:
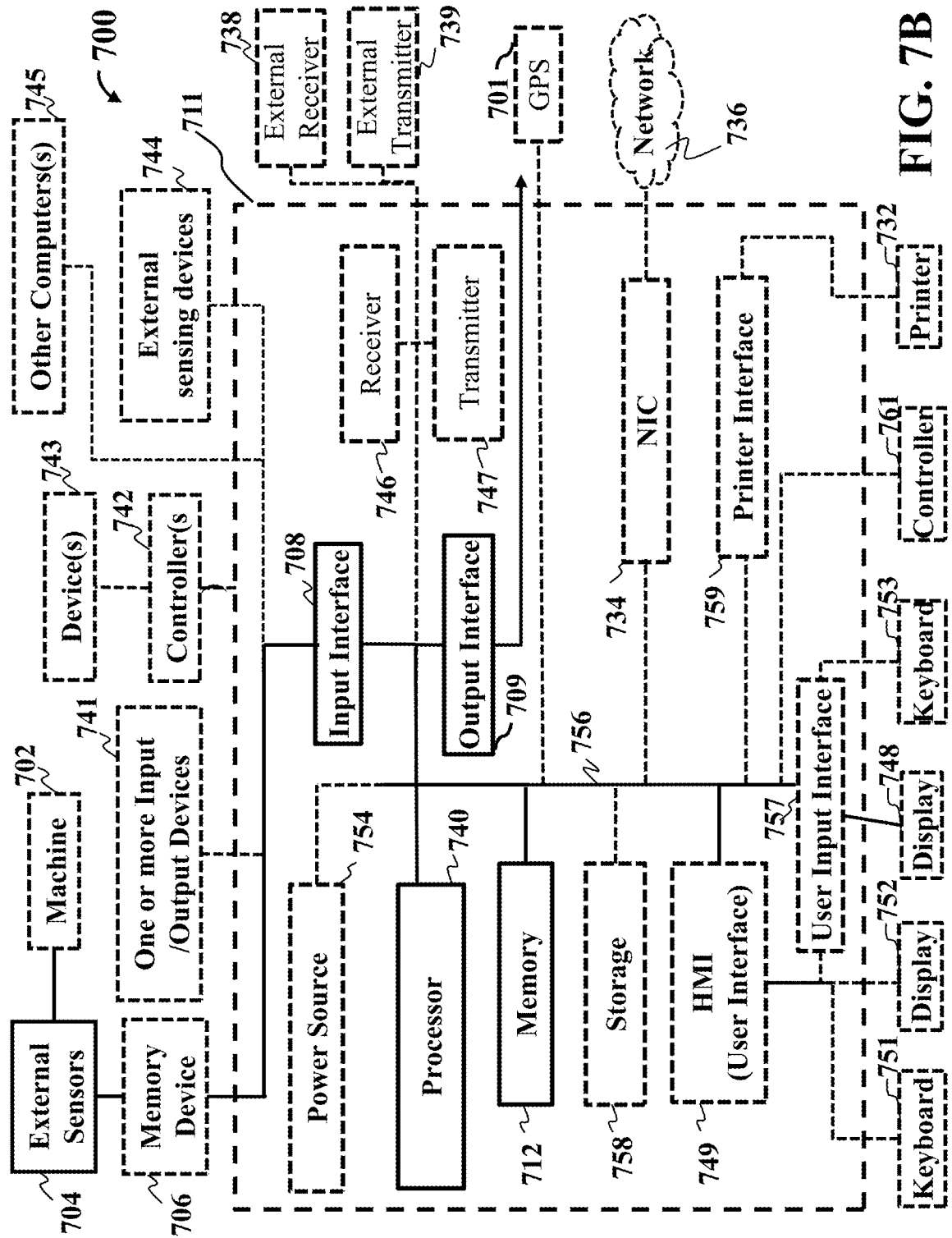
FIG. 7B is a schematic diagram illustrating an alternate processor, according to some embodiments of the present disclosure.

FIG. 7B is a schematic illustrating by non-limiting example a computing apparatus 700 that can be used to implement some techniques of the methods and systems, according to embodiments of the present disclosure. The computing apparatus or device 700 represents various forms of digital computers, such as laptops, desktops, workstations, personal digital assistants, servers, blade servers, mainframes, and other appropriate computers.

The computing device 700 can include a power source 708, a processor 709, a memory 710, a storage device 711, all connected to a bus 750. Further, a high-speed interface 712, a low-speed interface 713, high-speed expansion ports 714 and low speed connection ports 715, can be connected to the bus 750. In addition, a low-speed expansion port 716 is in connection with the bus 750. Contemplated are various component configurations that may be mounted on a common motherboard, by non-limiting example, 730, depending upon the specific application. Further still, an input interface 717 can be connected via bus 750 to an external receiver 706 and an output interface 718. A receiver 719 can be connected to an external transmitter 707 and a transmitter 720 via the bus 750. Also connected to the bus 750 can be an external memory 704, external sensors 703, machine(s) 702 and an environment 701. Further, one or more external input/output devices 705 can be connected to the bus 750. A network interface controller (NIC) 721 can be adapted to connect through the bus 750 to a network 722, wherein data or other data, among other things, can be rendered on a third party display device, third party imaging device, and/or third party printing device outside of the computer device 700.

Contemplated is that the memory 710 can store instructions that are executable by the computer device 700, historical data, and any data that can be utilized by the methods and systems of the present disclosure. The memory 710 can include random access memory (RAM), read only memory (ROM), flash memory, or any other suitable memory systems. The memory 710 can be a volatile memory unit or units, and/or a non-volatile memory unit or units. The memory 710 may also be another form of computer-readable medium, such as a magnetic or optical disk.

Still referring to FIG. 7B, a storage device 711 can be adapted to store supplementary data and/or software modules used by the computer device 700. For example, the storage device 711 can store historical data and other related data as mentioned above regarding the present disclosure. Additionally, or alternatively, the storage device 711 can store historical data similar to data as mentioned above regarding the present disclosure. The storage device 711 can include a hard drive, an optical drive, a thumb-drive, an array of drives, or any combinations thereof. Further, the storage device 711 can contain a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 709), perform one or more methods, such as those described above.

The system can be linked through the bus 750 optionally to a display interface or user Interface (HMI) 723 adapted to connect the system to a display device 725 and keyboard 724, wherein the display device 725 can include a computer monitor, camera, television, projector, or mobile device, among others.

Still referring to FIG. 7B, the computer device 700 can include a user input interface 717 adapted to a printer interface (not shown) can also be connected through bus 750 and adapted to connect to a printing device (not shown), wherein the printing device can include a liquid inkjet printer, solid ink printer, large-scale commercial printer, thermal printer, UV printer, or dye-sublimation printer, among others.

The high-speed interface 712 manages bandwidth-intensive operations for the computing device 700, while the low-speed interface 713 manages lower bandwidth-intensive operations. Such allocation of functions is an example only. In some implementations, the high-speed interface 712 can be coupled to the memory 710, a user interface (HMI) 723, and to a keyboard 724 and display 725 (e.g., through a graphics processor or accelerator), and to the high-speed expansion ports 714, which may accept various expansion cards (not shown) via bus 750. In the implementation, the low-speed interface 713 is coupled to the storage device 711 and the low-speed expansion port 715, via bus 750. The low-speed expansion port 715, which may include various communication ports (e.g., USB, Bluetooth, Ethernet, wireless Ethernet) may be coupled to one or more input/output devices 705, and other devices a keyboard 724, a pointing device (not shown), a scanner (not shown), or a networking device such as a switch or router, e.g., through a network adapter.

Still referring to FIG. 7B, the computing device 700 may be implemented in a number of different forms, as shown in the figure. For example, it may be implemented as a standard server 726, or multiple times in a group of such servers. In addition, it may be implemented in a personal computer such as a laptop computer 727. It may also be implemented as part of a rack server system 728. Alternatively, components from the computing device 700 may be combined with other components in a mobile device (not shown). Each of such devices may contain one or more of the computing device and the mobile computing device, and an entire system may be made up of multiple computing devices communicating with each other.

Embodiments

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, with machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Further, embodiments of the present disclosure and the functional operations described in this specification can be implemented in digital electronic circuitry, in tangibly embodied computer software or firmware, in computer hardware, including the structures disclosed in this specification and their structural equivalents, or in combinations of one or more of them. Further, some embodiments of the present disclosure can be implemented as one or more computer programs, i.e., one or more modules of computer program instructions encoded on a tangible non-transitory program carrier for execution by, or to control the operation of, data processing apparatus. Further still, program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure, the term "data processing apparatus" can encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A tactile sensor for a robot, comprising:
an elastically deformable element including an outer impact surface and an undersurface having pins, ridges, or both, each undersurface pin or ridge includes a mark, and the elastically deformable element is attached to a gripper;
a camera positioned in a cavity of the gripper to capture images of the marks;
a memory having stored data including image data of sets of prelearned positions of marks with corresponding prelearned patterns of forces, each set of prelearned positions of marks corresponds to a prelearned pattern of forces;

an image processor operatively connected to the camera and the memory, is configured to:
  detect positions of the marks in captured images;
  compare the detected positions of the marks in the captured images to the sets of the prelearned positions of marks, based on a distance function, to determine a quality of match value for each set of the prelearned positions of marks;
  determine a best quality matched prelearned pattern of forces using a user selected best matching function, that is applied to the determined quality of match values, to calculate a best matching set of the prelearned positions of marks and the corresponding best quality matched prelearned pattern of forces;
  identify a pattern of forces acting on the elastically deformable element based on the determined best matched prelearned pattern of forces; and
  output the identified pattern of forces to initiate a gripper action for the gripper based on the identified pattern of forces acting on the deformable element.

2. The tactile sensor of claim 1, wherein the image processor converts the position of each mark in the captured images by identifying measured image coordinates of locations in images of the captured images using an image measuring function.

3. The tactile sensor of claim 2, wherein the detected position of each mark are summed as Euclidean distances between the detected positions of the marks and the prelearned positions of the marks, thereby forming a match distance between the captured image of the mark and the prelearned image of the mark.

4. The tactile sensor of claim 1, wherein the determining of the pattern of forces acting on the elastically deformable element includes using a machine vision algorithm.

5. The tactile sensor of claim 1, wherein the pattern of forces acting on the elastically deformable element includes one or a combination of, a perpendicular pressure Z, a centered pressure, an offset pressure, a lateral shear force X, a shear force Y, torques in a pitch, a yaw, or a roll, a pinch lateral force X, a spread lateral force X, a spread lateral force Y, or a pinch shear force Y.

6. The tactile sensor of claim 1, wherein the gripper is attached to a robot that is a dynamic robot configured to move, and the gripper is controlled based upon the gripper action, the gripper is configured to accept other gripper actions determined by the image processor via other sensor data obtained from other sensors in communication with the image processor or by a user of the gripper.

7. The tactile sensor of claim 1, wherein the distance function used to compare the detected positions of the marks to the sets of the prelearned positions of marks, is based on a Euclidean distance function.

8. The tactile sensor of claim 1, wherein the best matched set of the prelearned positions of marks is determined using the user selected matching function that includes: (1) a best quality of match via the distance function; (2) a predetermined weighted average among a user selected number of best quality of match values, or a user-specified weighting function of all quality of matched values that is dynamically updateable; or (3) a predetermined weighted sum of all quality of matched values.

9. The tactile sensor of claim 1, wherein each pattern of forces includes a set of forces perpendicular to the outer impact surface, torque forces and shear forces, wherein, when forces are applied to the outer impact surface, the outer impact surface elastically deforms, causing the undersurface pins, ridges or both, to undergo a flexing motion, which displaces the marks.

10. The tactile sensor of claim 1, wherein the outer impact surface changes between a undeformed state when no forces are applied to the outer impact surface, and an elastically deformed state when forces are applied to the outer impact surface which elastically deforms the outer impact surface, causing the undersurface pins, ridges or both, to undergo a flexing motion, which displaces the marks, and wherein the image processor compares the positions of the marks in the captured images by evaluating a relative position of the undersurface pins, ridges or both, between the undeformed state and the elastically deformed state.

11. The tactile sensor of claim 1, wherein the outer impact surface includes attributes, the attributes including one or a combination of at least one texture such as a smooth texture or a rough texture, symmetrical protuberances, non-symmetrical protuberances, or a pattern of protuberances with or without the at least one texture, and are structured and arranged in combination with the undersurface pins, ridges, or both, to provide user preferred measurable sensitivities of the pattern of forces, according to a user specified application directed to a set of measurable forces.

12. A tactile sensor for a robot, having an deformable element including an outer impact surface and an undersurface having pins, ridges, or both, each undersurface pin or ridge includes a mark, and the deformable element is attached to a gripper of the robot, and a camera positioned in a cavity of the gripper to capture images of the marks, along with a memory having stored data including image data of sets of prelearned positions of marks with corresponding prelearned patterns of forces, each set of prelearned positions of marks corresponds to a prelearned pattern of forces, the tactile sensor comprising:
  an image processor operatively connected to the camera and the memory, is configured to
    detect positions of the marks in captured images;
    compare the detected positions of the marks in the captured images to the sets of the prelearned positions of marks, based on a distance function, to determine a quality of match value for each set of the prelearned positions of marks;
    determine a best quality matched prelearned pattern of forces using a user selected best matching function;
    identify a pattern of forces acting on the deformable element based on the determined best matched prelearned pattern of forces; and
    output the identified pattern of forces to initiate a gripper action for the gripper based on the identified pattern of forces acting on the deformable element.

13. The tactile sensor of claim 12, wherein the user selected best matching function is applied to the determined quality of match values, and calculates a best matching set of the prelearned positions of marks and the corresponding best quality matched prelearned pattern of forces.

14. The tactile sensor of claim 13, wherein the outer impact surface includes attributes, the attributes including one or a combination of at least one texture such as a smooth texture or a rough texture, symmetrical protuberances, non-symmetrical protuberances, or a pattern of protuberances with or without the at least one texture, and are structured and arranged in combination with the undersurface pins, ridges, or both, to provide user preferred measurable sensitivities of the pattern of forces, according to a user specified application directed to a set of measurable forces.

15. The tactile sensor of claim 12, wherein the outer impact surface includes attributes, such that the attributes are structured and arranged to include at least one region of a rough texture that provides for a user preferred increase and uniform measurable sensitivities of a pattern of forces including detecting an amount of measurable perpendicular forces to the outer impact surfaces across the elastically deformable element, according to a user specified application directed to a set of measurable forces.

16. The tactile sensor of claim 12, wherein the attributes are structured and arranged to include a combination of one of cone shape protuberances, symmetrical protuberances or non-symmetrical protuberances, that provide user preferred increase of measurable sensitivities of the pattern of forces including detecting an amount of measurable in-plane forces, shear forces and torque forces, to the outer impact surfaces across the tactile sensor, according to a user specified application directed to a set of measurable forces.

17. The tactile sensor of claim 12, wherein the attributes are structured and arranged to include at least one region of ridge-like protuberances positioned perpendicular to an axis of user preferred measureable sensitivities to measurable forces or torques of the pattern of forces, according to a user specified application directed to a set of measurable forces.

18. The tactile sensor of claim 12, wherein the attributes include a user predetermined pattern of one or a combination of a rough texture, cone shape protuberances, symmetrical protuberances, non-symmetrical protuberances, ridges like protuberances positioned perpendicular to an axis of a preferred measureable sensitivity, that provides user preferred measurable sensitivities of a pattern of forces, according to a user specified application directed to a set of measurable forces.

19. A method for tactile sensing, having an elastically deformable element with an outer impact surface and an undersurface having pins, ridges, or both, the undersurface pin or ridge includes a mark, and the elastically deformable element is attached to a gripper of the robot, and a camera positioned in a cavity of the gripper to capture images of the marks, the method comprising:
capture images from the camera;
accessing a memory having stored data that includes image data of sets of prelearned positions of marks with prelearned patterns of forces, each set of prelearned positions of marks corresponds to a prelearned pattern of forces;
detecting positions of the marks in captured images;
evaluating the captured images to detect the positions of each mark in the captured images, and compare the detected positions of the mark in the captured images to the sets prelearned positions of marks of the image data, based on a distance function, to obtain a quality of match value for each set of the prelearned positions of marks;
applying a user selected best matching function to the quality of match values, to calculate a best matching set of the prelearned positions of marks and the corresponding best quality matched prelearned pattern of forces;
identifying a pattern of forces acting on the elastically deformable element based on the determined best matched prelearned pattern of forces; and
outputting the identified pattern of forces to initiate a gripper action for the gripper, based on the identified pattern of forces acting on the elastically deformable element.

20. An elastomeric tactile sensor for a robot, having an deformable element including an outer impact surface and an undersurface having pins, ridges, or both, each undersurface pin or ridge includes a mark, and the deformable element is attached to a gripper of the robot, and a camera positioned in a cavity of the gripper to capture images of the marks, along with a memory having stored data including image data of sets of prelearned positions of marks with corresponding prelearned patterns of forces, each set of prelearned positions of marks corresponds to a prelearned pattern of forces, the tactile sensor comprising:
an image processor operatively connected to the camera and the memory, is configured to
detect positions of the marks in captured images;
compare the detected positions of the marks in the captured images to the sets of the prelearned positions of marks, based on a distance function, to determine a quality of match value for each set of the prelearned positions of marks;
determine a best quality matched prelearned pattern of forces using a user selected best matching function;
identify a pattern of forces acting on the deformable element based on the determined best matched prelearned pattern of forces; and
output the identified pattern of forces to initiate a gripper action for the gripper based on the identified pattern of forces acting on the deformable element, wherein the identified pattern of forces includes one or a combination of, a perpendicular pressure Z, a centered pressure, an offset pressure, a lateral force, i.e. a lateral shear force X, a lateral shear force Y, centered or offset torques in a pitch, a yaw, or a roll, a centered or offset pinch force X, a centered or offset pinch force Y, a centered or offset spreading lateral force X, a centered or offset spreading lateral force Y.

* * * * *